US012779858B2

(12) United States Patent
Nakazawa et al.

(10) Patent No.: US 12,779,858 B2
(45) Date of Patent: Nov. 3, 2026

(54) LIQUID DISCHARGING APPARATUS

(71) Applicant: BROTHER KOGYO KABUSHIKI KAISHA, Nagoya (JP)

(72) Inventors: Fumio Nakazawa, Okazaki (JP); Yoshinori Osakabe, Seto (JP); Taichi Shirono, Nagoya (JP); Sosuke Kuroyanagi, Nishio (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/481,707

(22) Filed: Sep. 22, 2021

(65) Prior Publication Data

US 2022/0097387 A1 Mar. 31, 2022

(30) Foreign Application Priority Data

Sep. 30, 2020 (JP) ................................ 2020-166559

(51) Int. Cl.
*B41J 2/175* (2006.01)
*B41J 2/165* (2006.01)

(52) U.S. Cl.
CPC ........... *B41J 2/175* (2013.01); *B41J 2/16508* (2013.01); *B41J 2/16523* (2013.01)

(58) Field of Classification Search
None
See application file for complete search history.

(56) References Cited

U.S. PATENT DOCUMENTS

| | | | |
|---|---|---|---|
| 5,841,451 | A | 11/1998 | Hirabayashi et al. |
| 7,367,660 | B2 | 5/2008 | Koga et al. |

(Continued)

FOREIGN PATENT DOCUMENTS

| | | | |
|---|---|---|---|
| CN | 105459610 | A | 4/2016 |
| JP | 2002-321386 | A | 11/2002 |

(Continued)

OTHER PUBLICATIONS

International Search Report and the Written Opinion dated Nov. 30, 2021 from related PCT application No. PCT/JP2021/035183.

(Continued)

*Primary Examiner* — Alejandro Valencia
(74) *Attorney, Agent, or Firm* — Scully, Scott, Murphy & Presser, P.C.

(57) ABSTRACT

A liquid discharging apparatus, having a head with a nozzle surface, a reservoir section having a liquid reservoir chamber and a first atmosphere communication path, a liquid flow path connecting the head with the liquid reservoir chamber, a first switching assembly to switch states of the first atmosphere communication path between a connecting state and a disconnecting state, a cap having a body and a second atmosphere communication path, a movable assembly to move the cap between a covering position and a separated position, and a controller, is provided. The controller is configured to control the head to discharge the liquid, and after discharging the liquid from the head, control the movable assembly to move the cap from the separated position to the covering position. With the cap being located at the covering position, the first atmosphere communication path is placed in the connecting state.

19 Claims, 17 Drawing Sheets

(56) References Cited

U.S. PATENT DOCUMENTS

| | | | | |
|---|---|---|---|---|
| 2006/0170739 | A1* | 8/2006 | Koga | B41J 2/175 347/85 |
| 2006/0170969 | A1 | 8/2006 | Koga et al. | |
| 2008/0007605 | A1* | 1/2008 | Sakurai | B41J 2/19 347/92 |
| 2009/0160915 | A1 | 6/2009 | Takahashi et al. | |
| 2010/0201765 | A1 | 8/2010 | Paku et al. | |
| 2013/0076829 | A1* | 3/2013 | Yamamoto | B41J 2/16508 347/32 |
| 2013/0135368 | A1* | 5/2013 | Kobayashi | B41J 2/17566 347/7 |
| 2014/0184709 | A1 | 7/2014 | Qian et al. | |
| 2014/0210906 | A1* | 7/2014 | Tone | B41J 2/16532 347/30 |
| 2016/0089893 | A1 | 3/2016 | Osakabe et al. | |
| 2018/0215156 | A1* | 8/2018 | Shimada | B41J 2/16538 |
| 2018/0281415 | A1* | 10/2018 | Mizuno | B41J 2/04563 |
| 2019/0061354 | A1 | 2/2019 | Tsubota | |
| 2019/0193404 | A1 | 6/2019 | Nishida | |
| 2020/0114655 | A1* | 4/2020 | Escudero Gonzalez | B41J 2/17566 |
| 2020/0290362 | A1* | 9/2020 | Tajima | B41J 2/175 |

FOREIGN PATENT DOCUMENTS

| | | | |
|---|---|---|---|
| JP | 2006-110798 | A | 4/2006 |
| JP | 2006-205691 | A | 8/2006 |
| JP | 2009-143154 | A | 7/2009 |
| JP | 2012-171106 | A | 9/2012 |
| JP | 2015-036223 | A | 2/2015 |
| JP | 2015-157378 | A | 9/2015 |
| JP | 2015-212047 | A | 11/2015 |
| JP | 2015-217556 | A | 12/2015 |
| JP | 2016-022656 | A | 2/2016 |
| JP | 2018-161820 | A | 10/2018 |
| JP | 2019038124 | A | 3/2019 |
| JP | 2019116054 | A | 7/2019 |

OTHER PUBLICATIONS

International Search Report and the Written Opinion dated Nov. 30, 2021 from related PCT application No. PCT/JP2021/035185.

Official Action dated Dec. 23, 2022 received in a related application, namely, U.S. Appl. No. 17/481,722 dated Sep. 22, 2021.

Office Action dated Apr. 17, 2023 received in No. U.S. Appl. No. 17/481,722.

Notice of Reasons for Refusal dated Nov. 7, 2023 received from the Japanese Patent Office in related application JP 2020-166559.

Notice of Reasons for Refusal dated Oct. 31, 2023 received in Japanese Patent Application No. JP 2020-166567.

Office Action dated Oct. 6, 2023 received in U.S. Appl. No. 17/481,722.

First Office Action dated Jun. 24, 2024 received in Chinese Patent Application No. CN 202180066279.1.

Office Action dated Mar. 1, 2024 received in U.S. Appl. No. 17/481,722.

Office Action dated Oct. 1, 2024 received in United States U.S. Appl. No. 17/481,722.

* cited by examiner

LIQUID DISCHARGING APPARATUS

CROSS REFERENCE TO RELATED APPLICATION

This application claims priority under 35 U.S.C. § 119 from Japanese Patent Application No. 2020-166559, filed on Sep. 30, 2020, the entire subject matter of which is incorporated herein by reference.

BACKGROUND

Technical Field

The present disclosure relates to a liquid discharging apparatus capable of conducting a discharging action to discharge liquid from nozzles of a head at a sheet.

Related Art

A liquid discharging apparatus, which may conduct a discharging action to discharge liquid from a head at a sheet, is known. During the discharging action, the liquid may be supplied from a reservoir section to the head. While the discharging action is not conducted, the nozzles of the head may be covered with a cap. The cap may have an atmosphere communication path, which is connected to outside atmosphere, and a releasing valve, which may open or close the atmosphere communication path. While the nozzles are covered with the cap, the atmosphere communication path may optionally be open or closed. For example, while the nozzles are covered with the cap, in a known liquid discharging apparatus, the releasing valve may close the atmosphere communication path; and in another known liquid discharging apparatus, for another example, the releasing valve may open the atmosphere communication path.

SUMMARY

Meanwhile, when the nozzles are covered with the cap, in other words, when the liquid discharging apparatus is not discharging the liquid, external force or pressure produced around the reservoir section and the head may be applied to the fluid in in the reservoir section and the head. For example, when the liquid discharging apparatus is moved from one location to another location, an external force due to sway, tilt, or roll of the liquid discharging apparatus may be applied to the liquid in the reservoir section and the head. For another example, expansion or contraction of the surrounding air due to changes in the temperature may cause an external force to be applied to the liquid in the reservoir section and the head. With these external forces, menisci formed with the liquid in the nozzles may deform or collapse rather easily.

The present disclosure is advantageous in that a liquid discharging apparatus, in which menisci in nozzles may be restrained from deforming or collapsing while the nozzles are covered with a cap, is provided.

According to an aspect of the present disclosure, a liquid discharging apparatus, having a head, a reservoir section, a liquid flow path, a first switching assembly, a cap, a movable assembly, and a controller, is provided. The head has a nozzle surface, on which nozzles are formed. The reservoir section has a liquid reservoir chamber configured to store liquid and a first atmosphere communication path connecting the liquid reservoir chamber with outside. The liquid flow path connects the head with the liquid reservoir chamber for the liquid to flow therein. The first switching assembly is configured to switch states of the first atmosphere communication path between a connecting state, in which the first atmosphere communication path is connected with the outside, and a disconnecting state, in which the first atmosphere communication path is disconnected from the outside. The cap has a body and a second atmosphere communication path. The body delimits a covering space and is configured to cover the nozzle surface through the covering space. The second atmosphere communication path connects the covering space with the outside. The movable assembly is configured to move the cap between a covering position, at which the body covers the nozzle surface, and a separated position, at which the body is separated from the nozzle surface. The controller is configured to control the head to discharge the liquid, and after discharging the liquid from the head, control the movable assembly to move the cap from the separated position to the covering position. With the cap being located at the covering position, the first atmosphere communication path is placed in the connecting state.

BRIEF DESCRIPTION OF THE ACCOMPANYING DRAWINGS

Figure 5A:
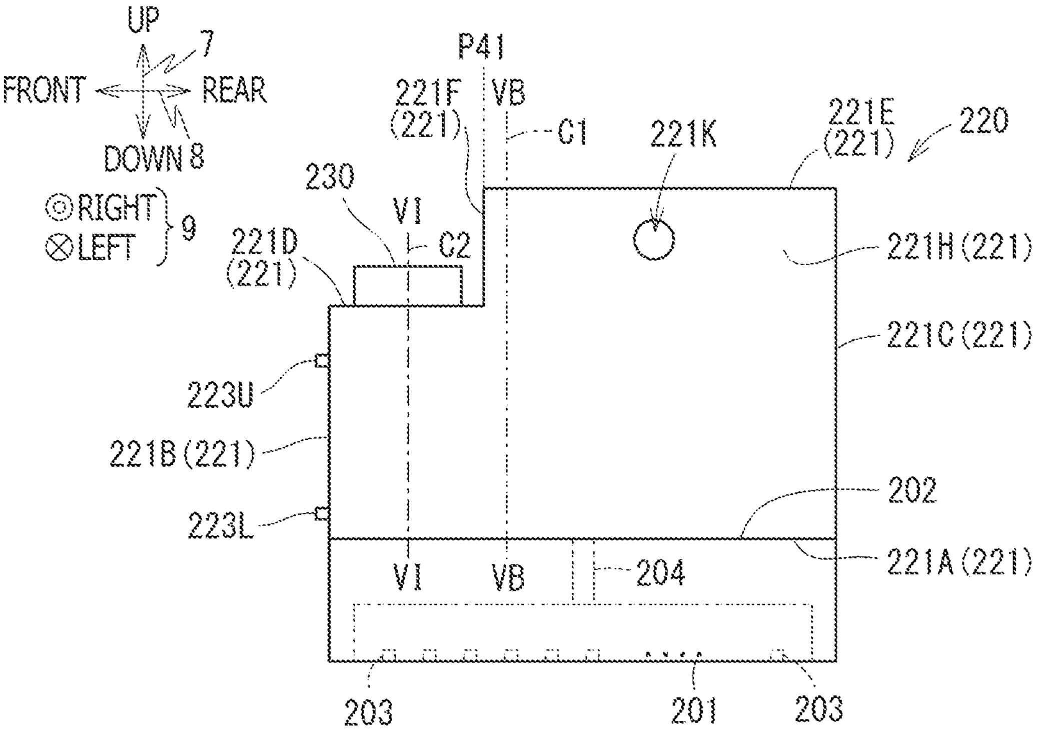
FIG. 5A is a rightward side view of the reservoir section 220 according to the embodiment of the present disclosure.
Figure 6A:
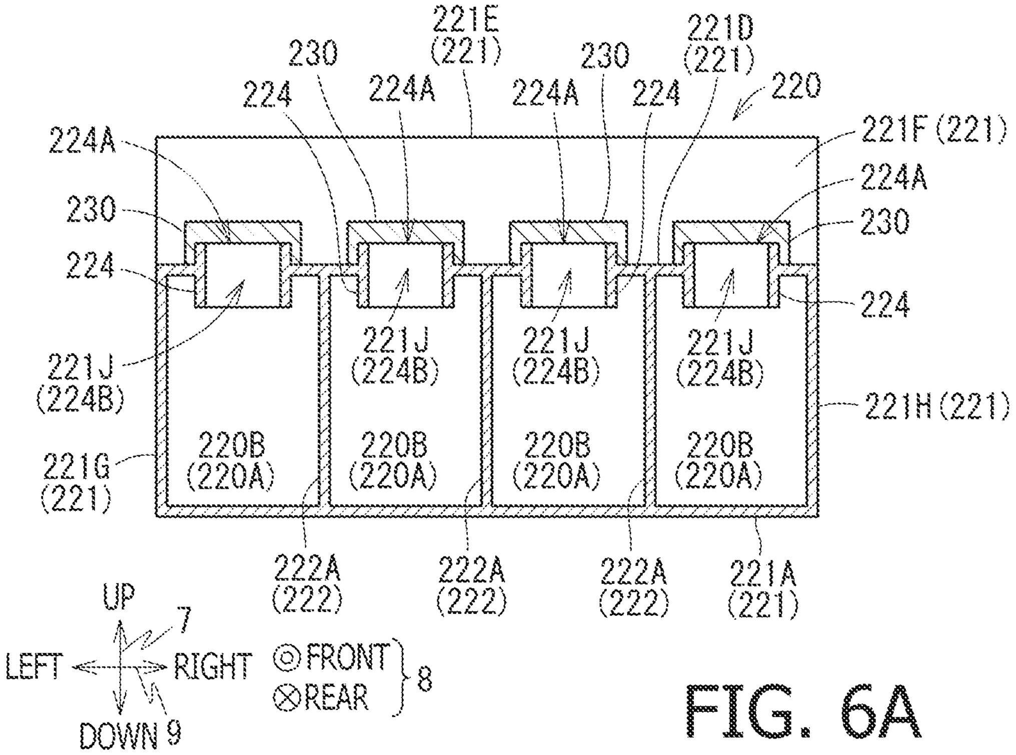
Figure 6B:
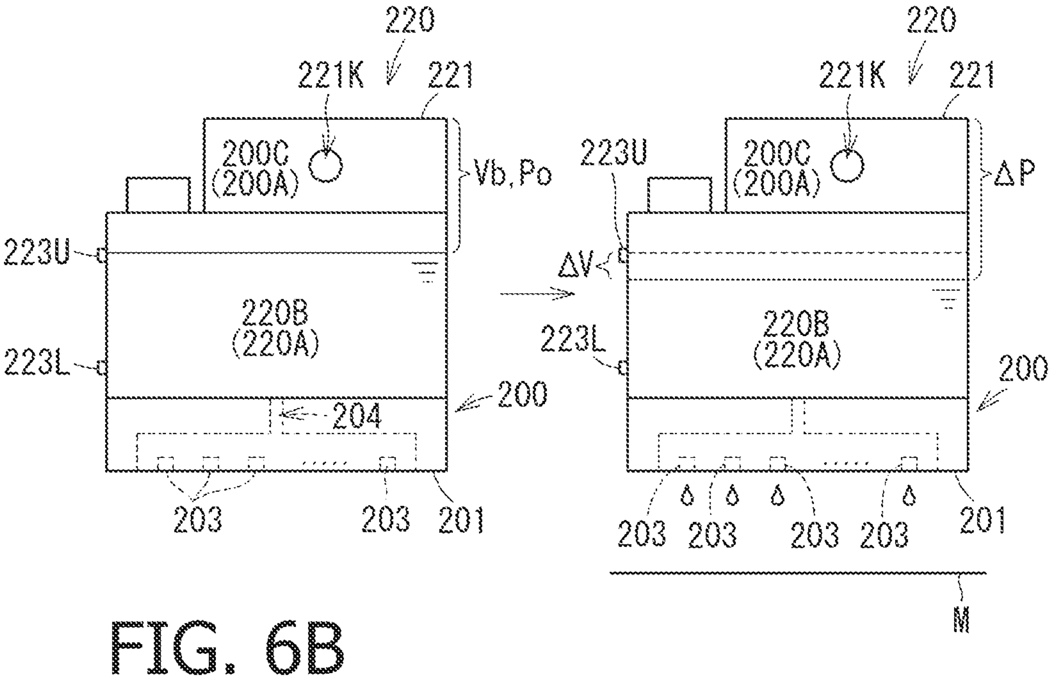

FIG. 6A is an illustrative view of a vertical cross-section C2 of the reservoir section 220, sectioned at a dash-and-dot line VI-VI indicated in FIG. 5A and viewed from the front side, according to the embodiment of the present disclosure. FIG. 6B is an illustrative view showing how to determine a volume Vb of an air portion in the reservoir section 220 according to the embodiment of the present disclosure.

Figure 7:
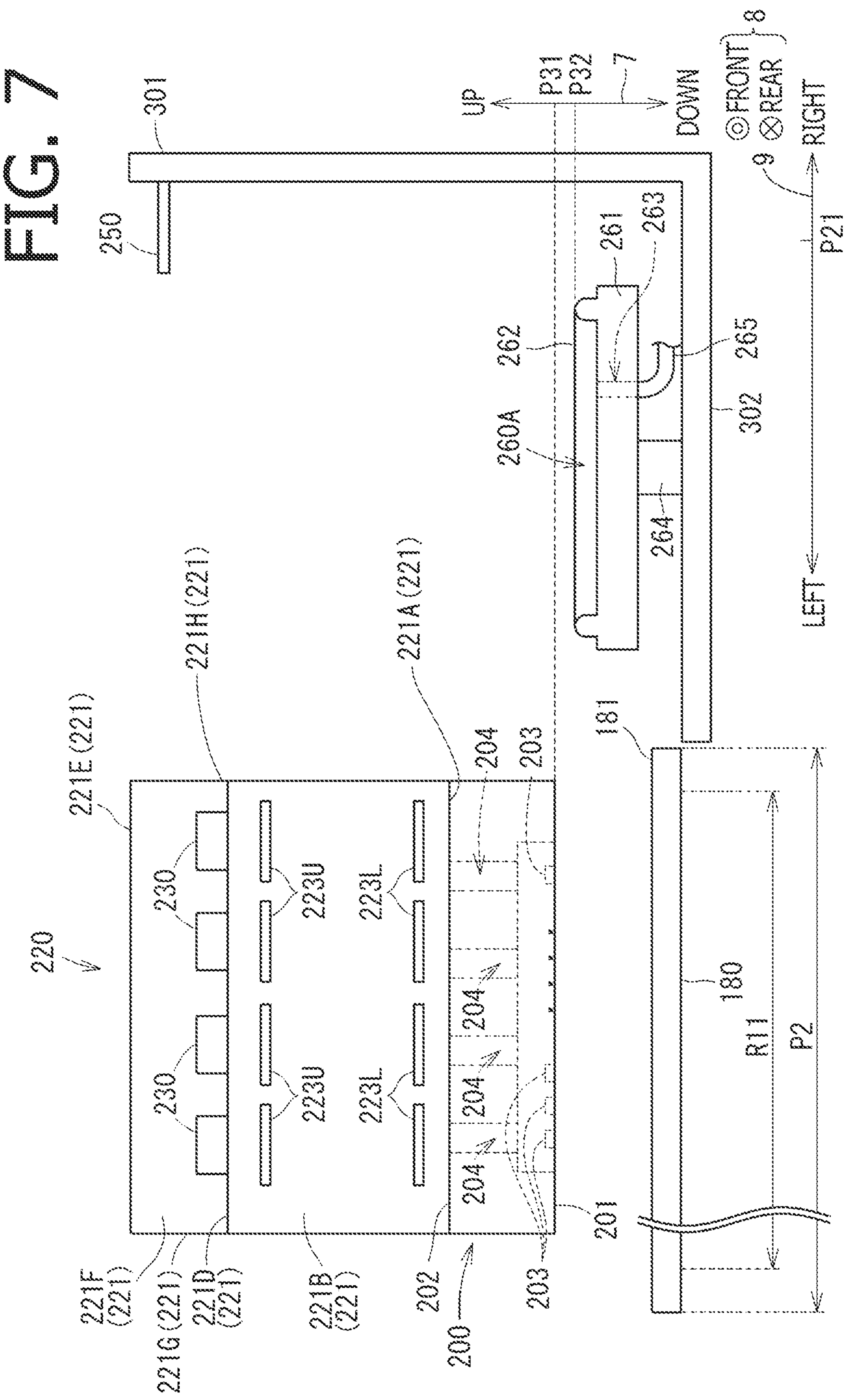

FIG. 7 is an illustrative view of the reservoir section 220 and the neighboring structure when the head 200 is separated from the capped position P21 in the printer 100 according to the embodiment of the present disclosure.

Figure 8:
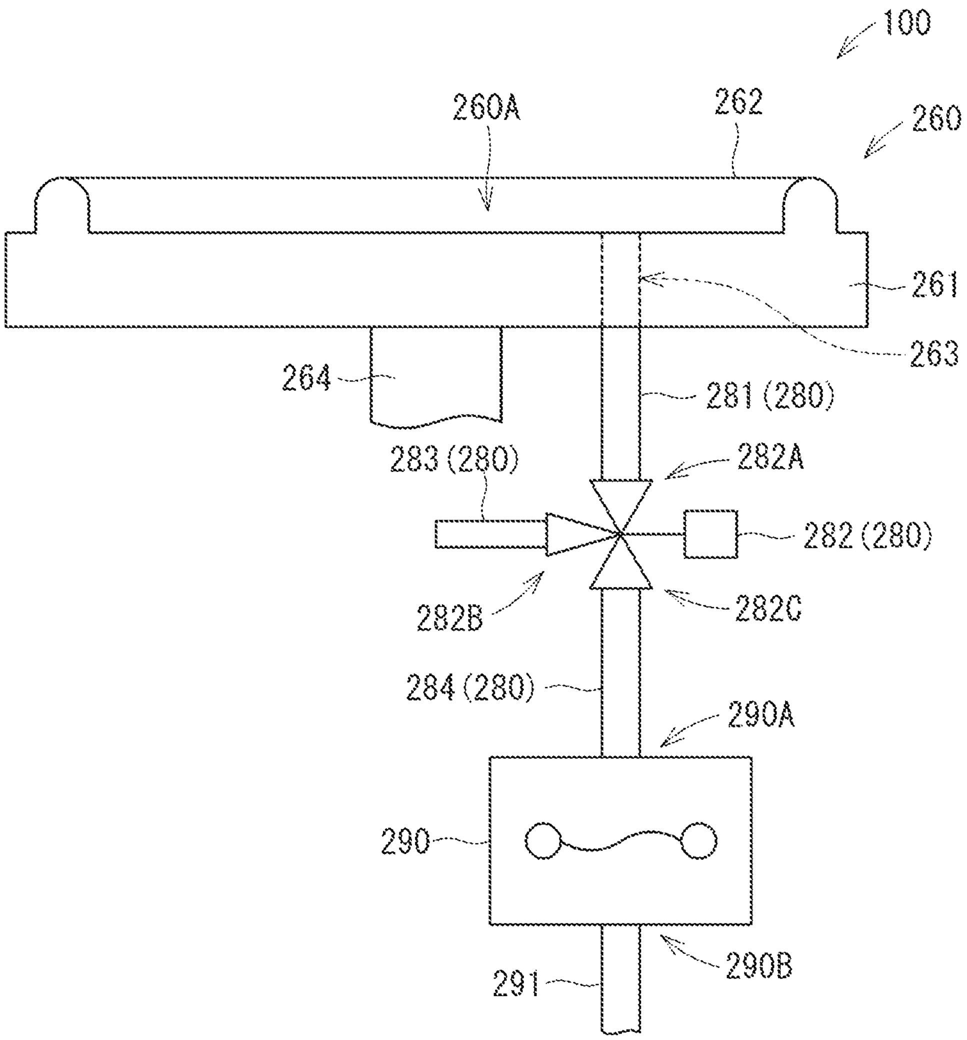

FIG. 8 is an illustrative view of a second switching assembly 280 according to the embodiment of the present disclosure.

Figure 9:
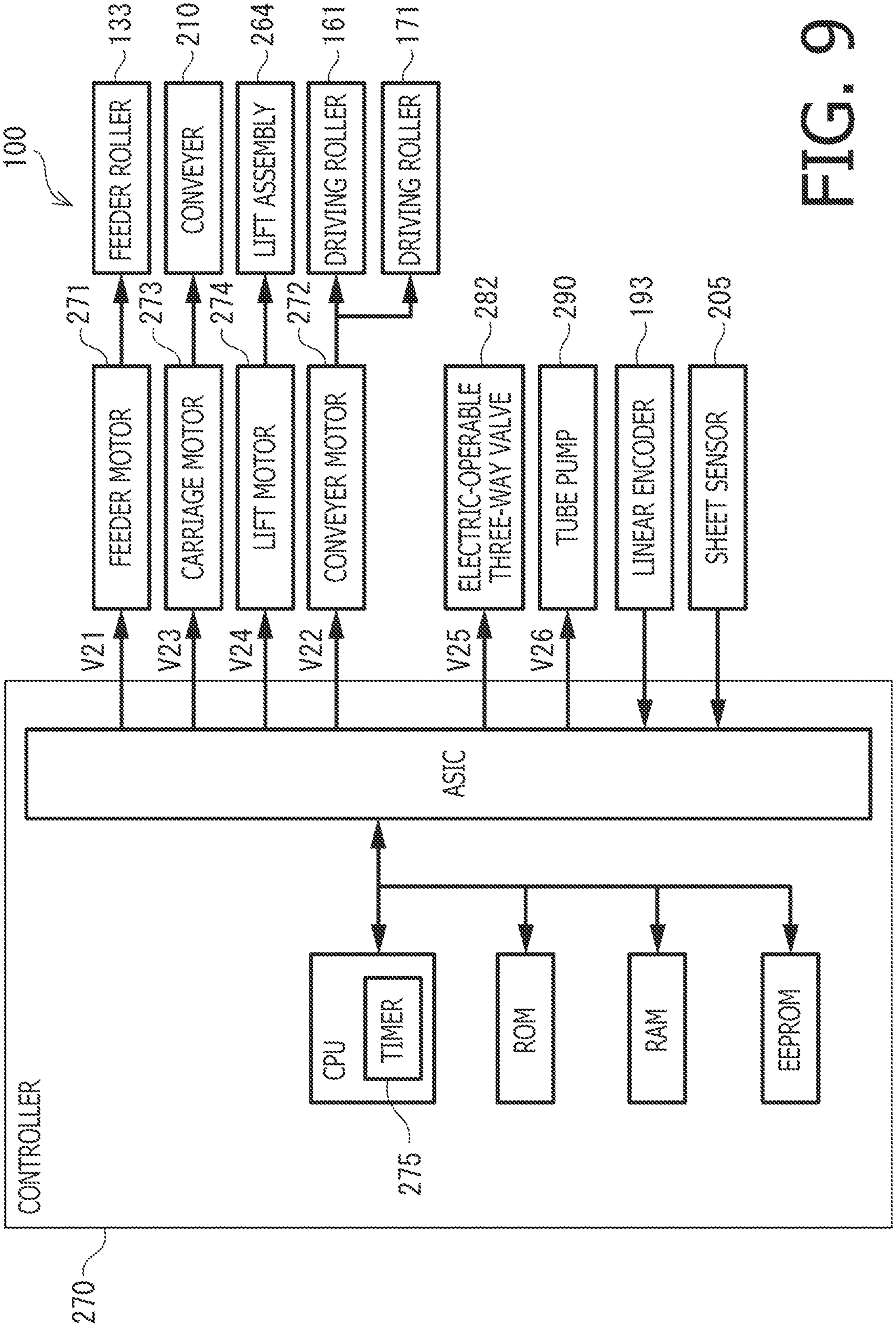

FIG. 9 is a block diagram to illustrate functional blocks in the printer 100 according to the embodiment of the present disclosure.

Figure 10A:
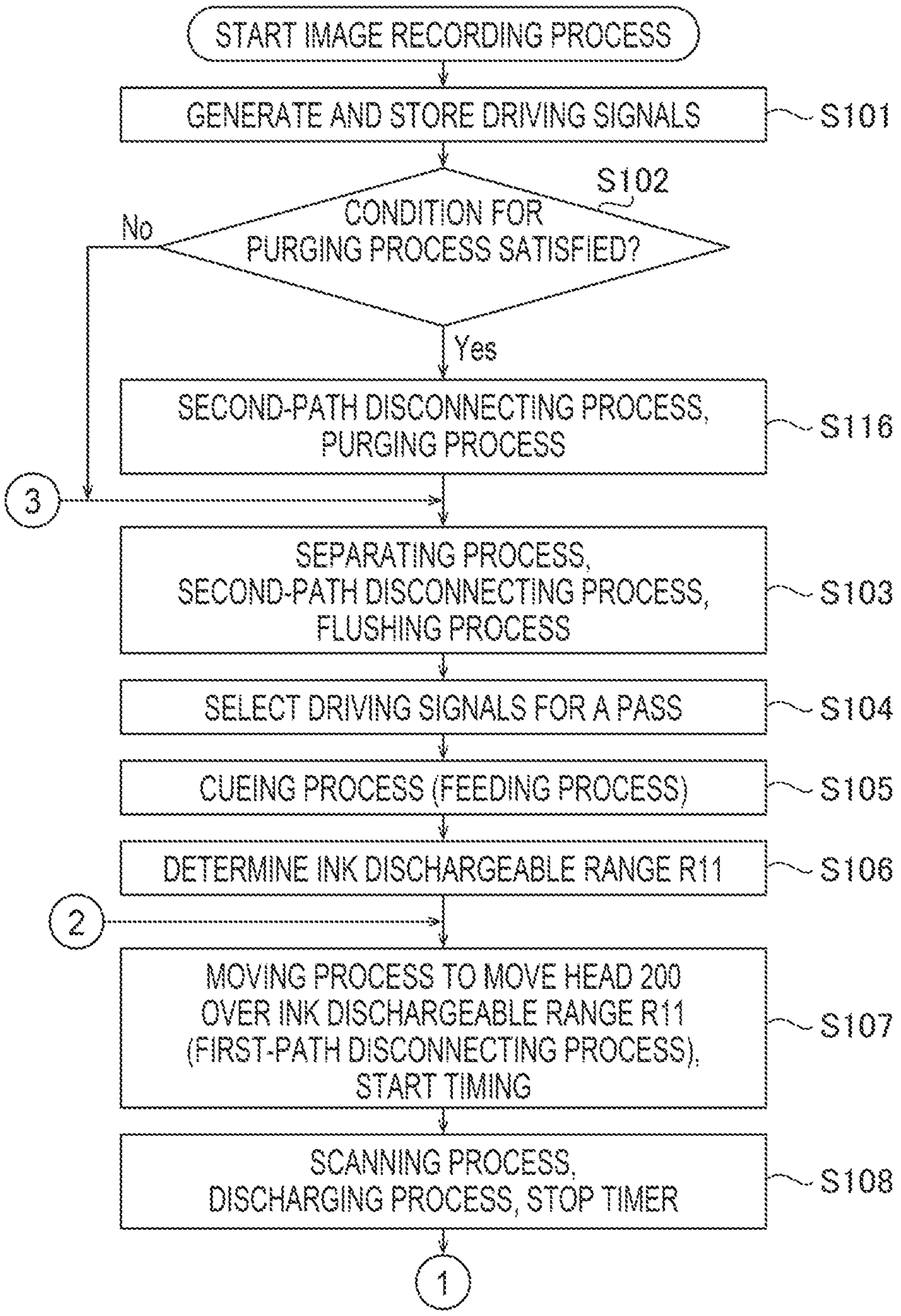
Figure 10B:
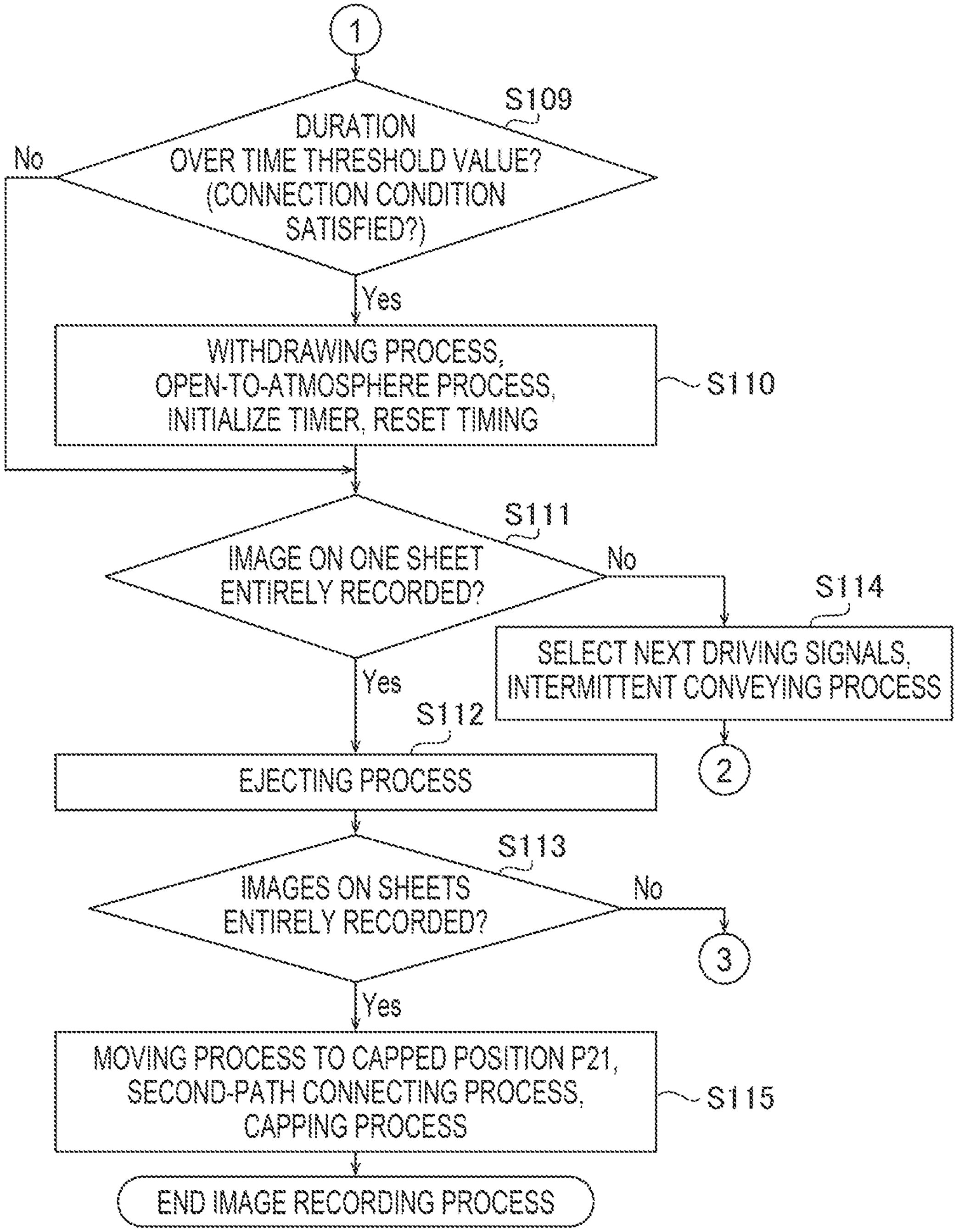

FIGS. 10A-10B are flowcharts to illustrate steps in an image recording process to be conducted in the printer 100 according to the embodiment of the present disclosure.

Figure 11A:
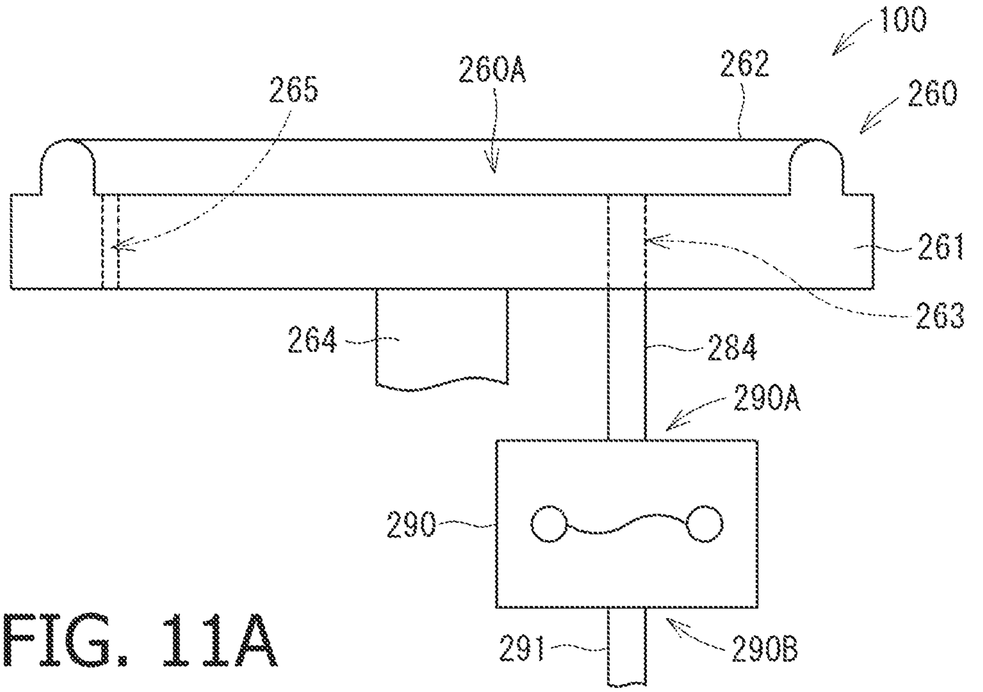
Figure 11B:
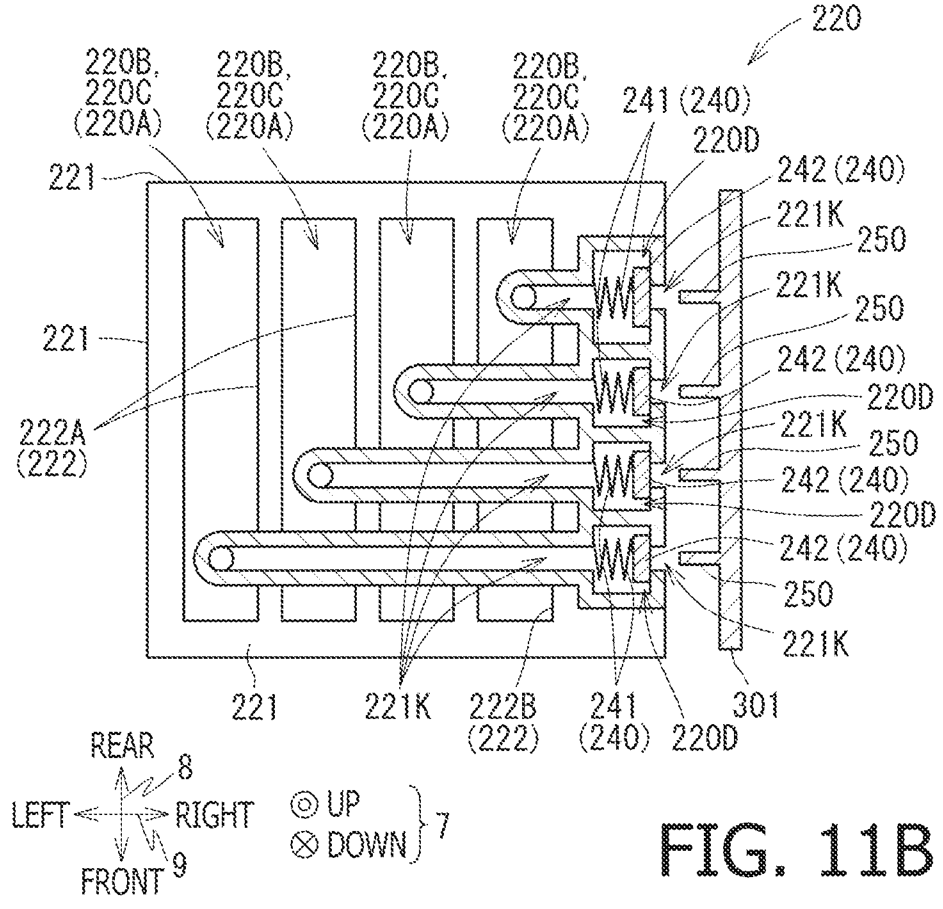

FIG. 11A is an illustrative view of a cap 260 in a first modified example of the embodiment of the present disclosure. FIG. 11B is an illustrative view of the reservoir section 220 in a second modified example of the embodiment of the present disclosure.

Figure 12A:
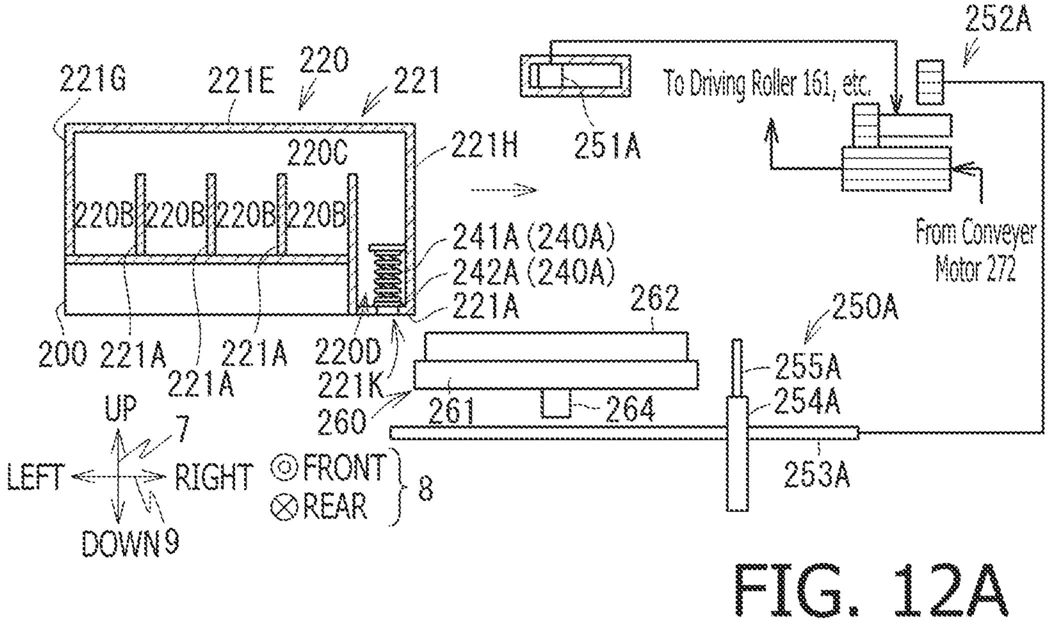
Figure 12B:
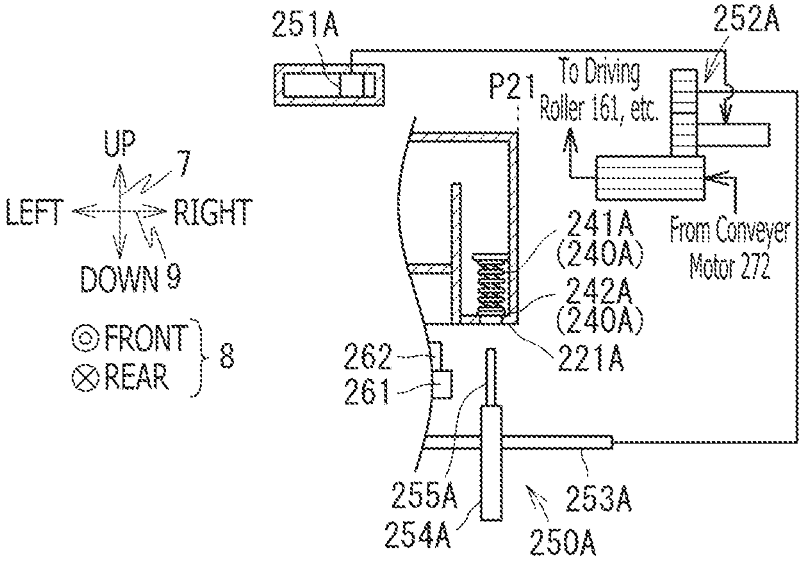
Figure 12C:
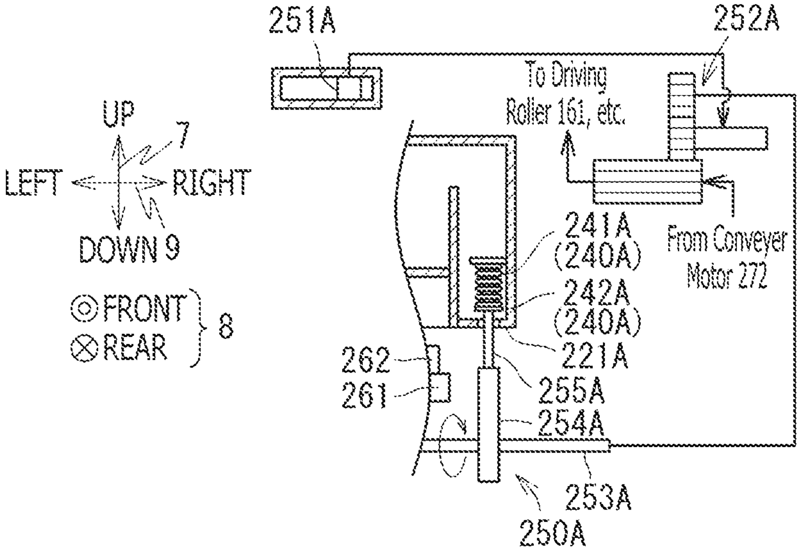

FIGS. 12A-12C are illustrative views of the reservoir section 220 and a first switching assembly in a fourth modified example of the embodiment of the present disclosure.

Figure 13:
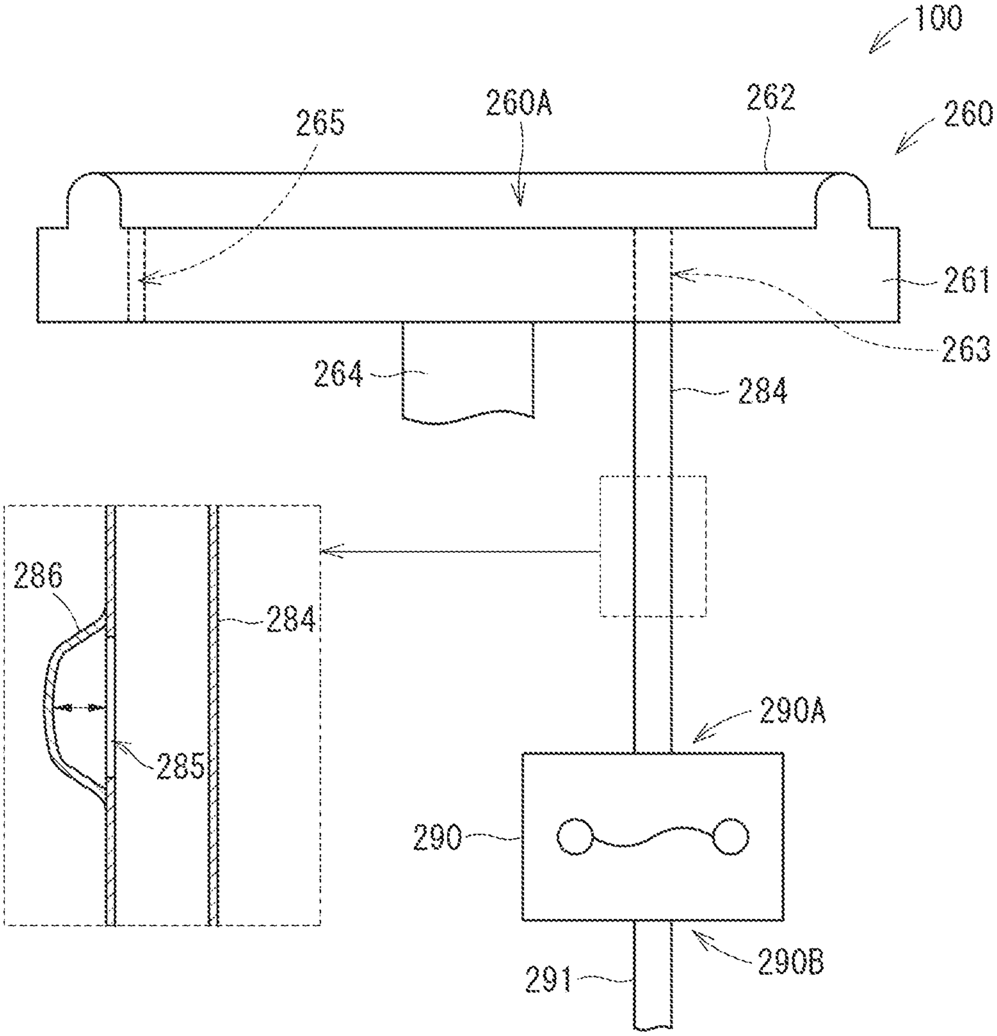

FIG. 13 is an illustrative view of an expandable/contractive member 286 in a fifth modified example of the embodiment of the present disclosure.

Figure 14A:
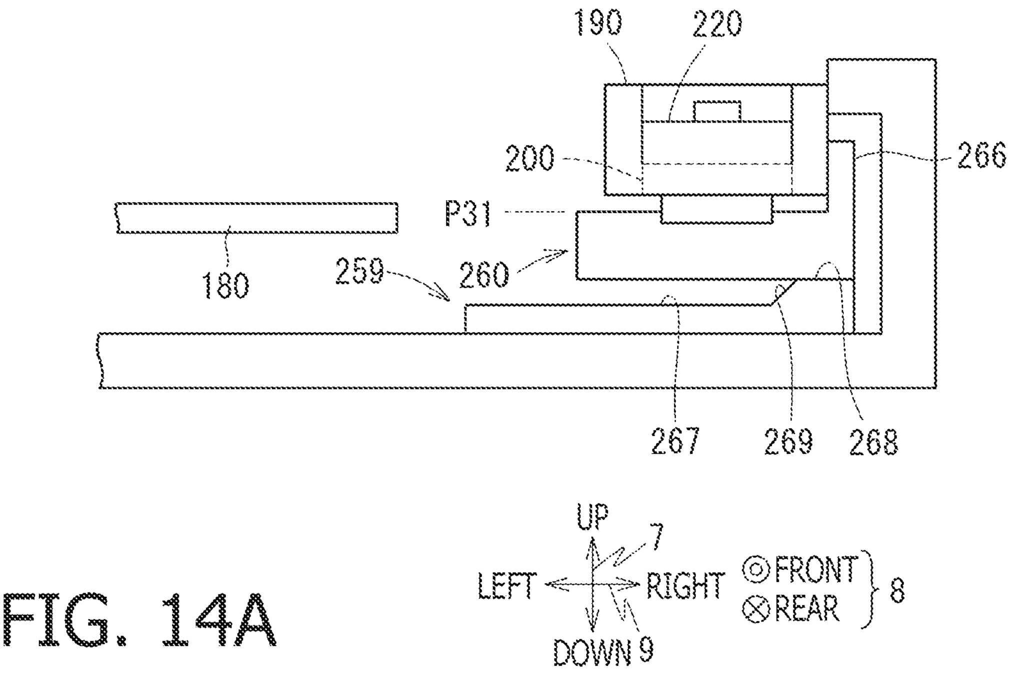
Figure 14B:
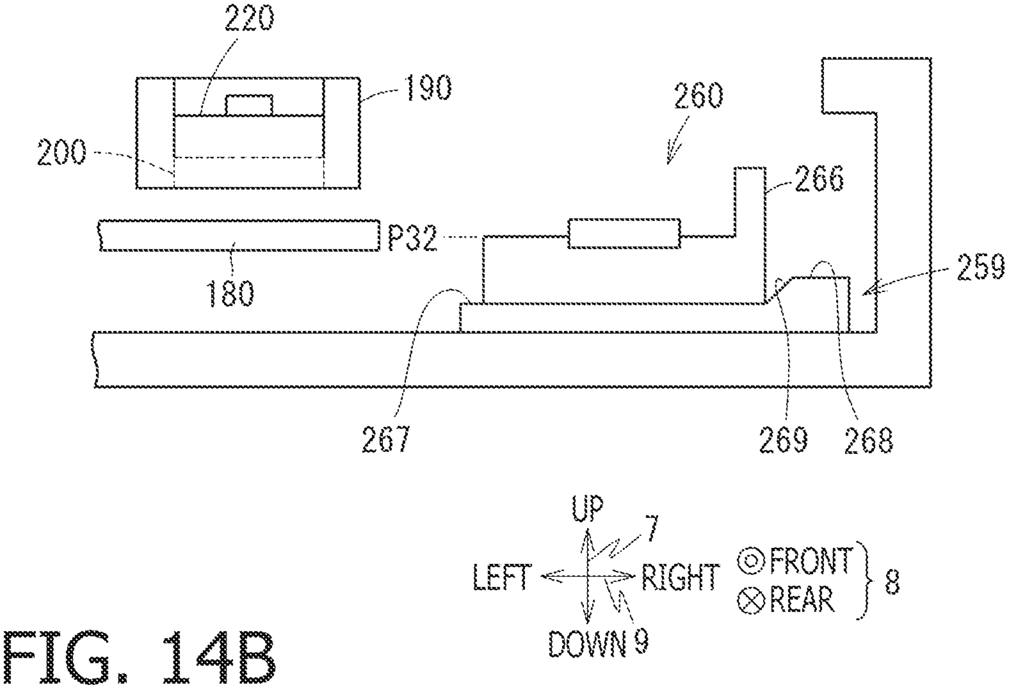

FIGS. 14A-14B illustrate the cap 260 at a capping position P31 and an uncapping position P32, respectively, and a lift assembly 259 in a sixth modified example of the embodiment of the present disclosure.

Figure 15A:
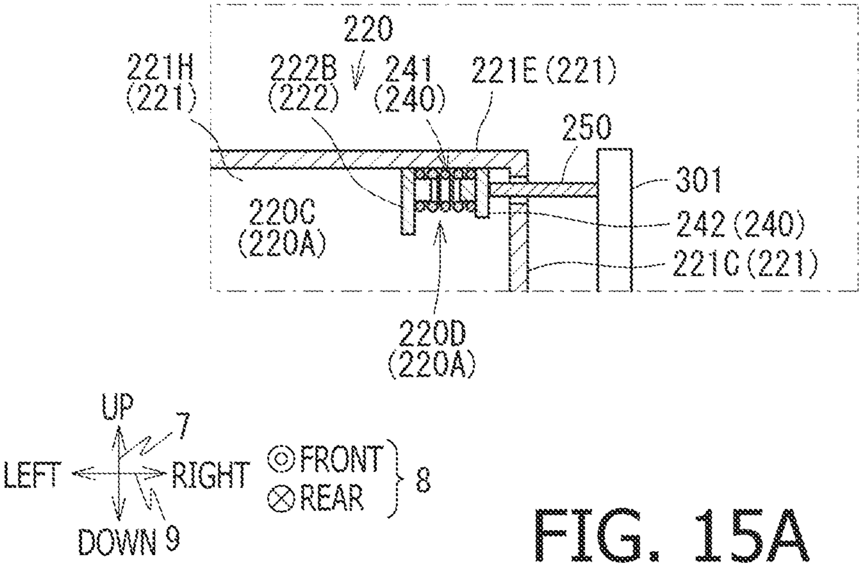
Figure 15B:
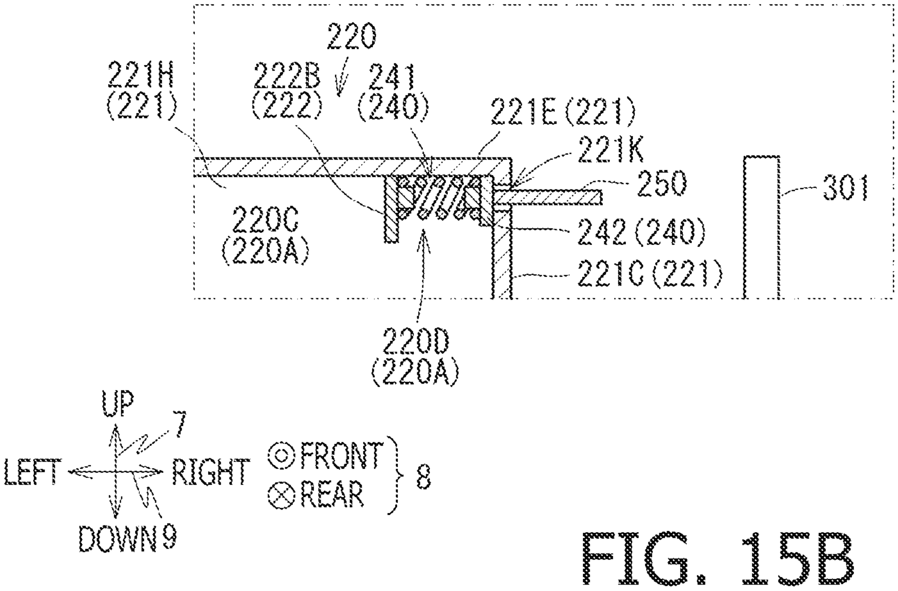

FIGS. 15A-15B illustrate a modified example of an opener member 250, connecting and disconnecting an atmosphere communication path 221K, respectively, according to the embodiment of the present disclosure.

DETAILED DESCRIPTION

Embodiment

In the following paragraphs, with reference to the accompanying drawings, an embodiment of the present disclosure will be described. It is noted that various connections may be set forth between elements in the following description. These connections in general and, unless specified otherwise, may be direct or indirect and this specification is not intended to be limiting in this respect.

In the following description, directivity indicated by a pointing arrow, from a root of a stem toward a pointing head, will be expressed by a term "orientation," whereas back or forth movability along a line extending through a stem and a pointing head of an arrow will be expressed by a term "direction."

Figure 1:
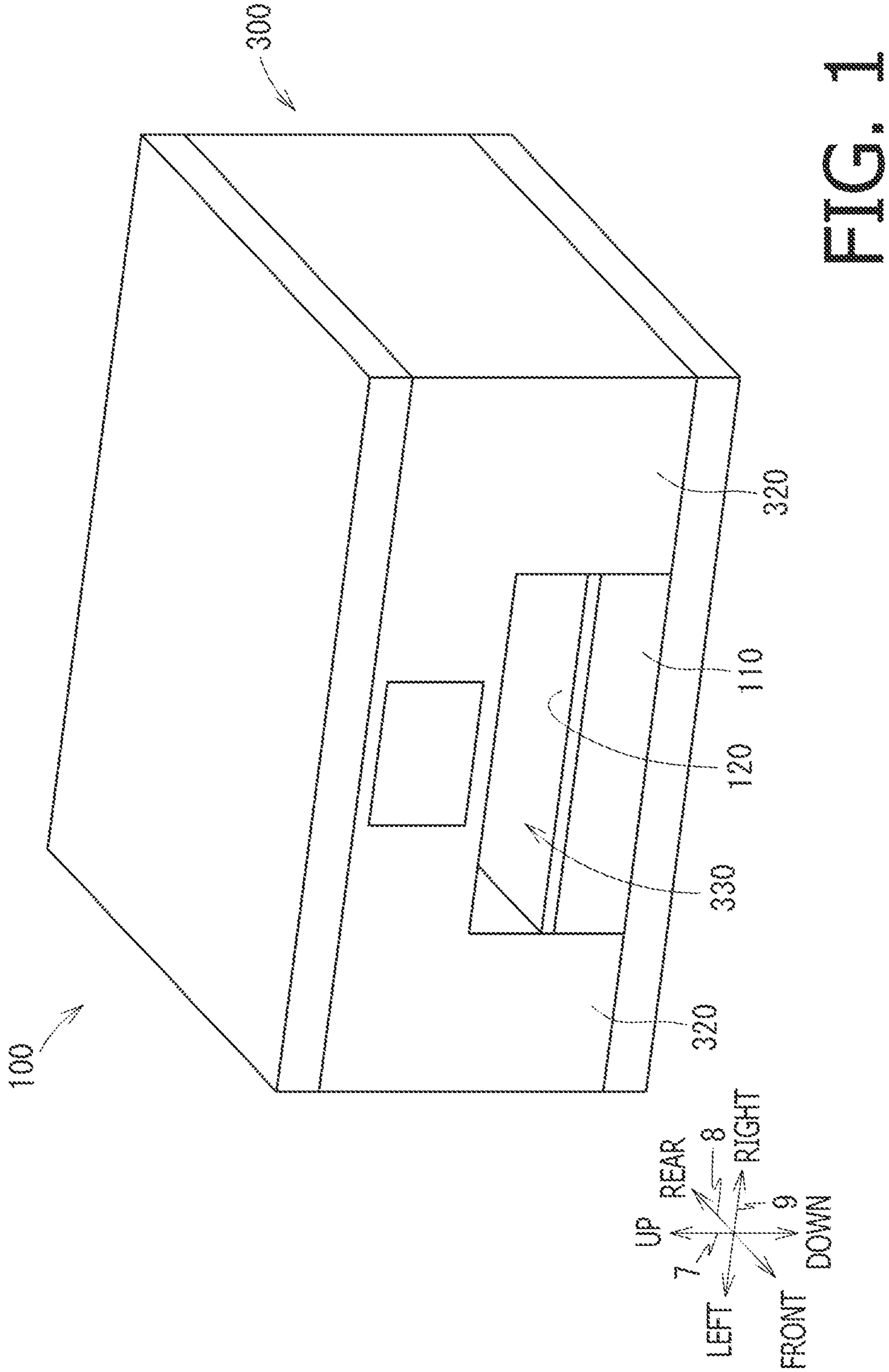
FIG. 1 is an exterior perspective view of a printer 100 according to an embodiment of the present disclosure.

Moreover, positional relation within the printer 100 and each part or item included in the printer 100 will be mentioned on basis of a posture of the printer 100 in an ordinarily usable condition as indicated by the bi-directionally pointing arrows in FIG. 1. For example, a vertical axis between an upper side and a lower side in FIG. 1 is defined as an up-down direction 7. A side, on which an opening 330 is formed, is defined as a front face 320, and an axis between the front side and a rear side opposite from the front side is defined as a front-rear direction 8. A right-hand side and a left-hand side to a user who faces the front face 320 of the printer 100 are defined as a rightward side and a leftward side, respectively. An axis between the rightward side and the leftward side is defined as a right-left direction 9. The up-down direction 7, the front-rear direction 8, and the right-left direction 9 intersect orthogonally to one another. In the following description, the up-down direction 7 and the right-left direction 9 may be referred to as a vertical direction 7 and a widthwise direction 9, respectively.

[Overall Configuration of Printer 100]

The printer 100 as shown in FIG. 1 may record a multicolored image in a plurality of, e.g., four (4), colors on a sheet M (see FIG. 2) in an inkjet recording method. The sheet M may be, for example, a sheet of paper or an OHP film. It may be noted, however, that the method to record the image on the sheet M may not necessarily be limited to inkjet recording but may be in a different recording method such as, for example, thermal-inkjet recording, which is also known as bubblejet (registered trademark) recording.

[Internal Configuration of Printer 100]

Figure 2:
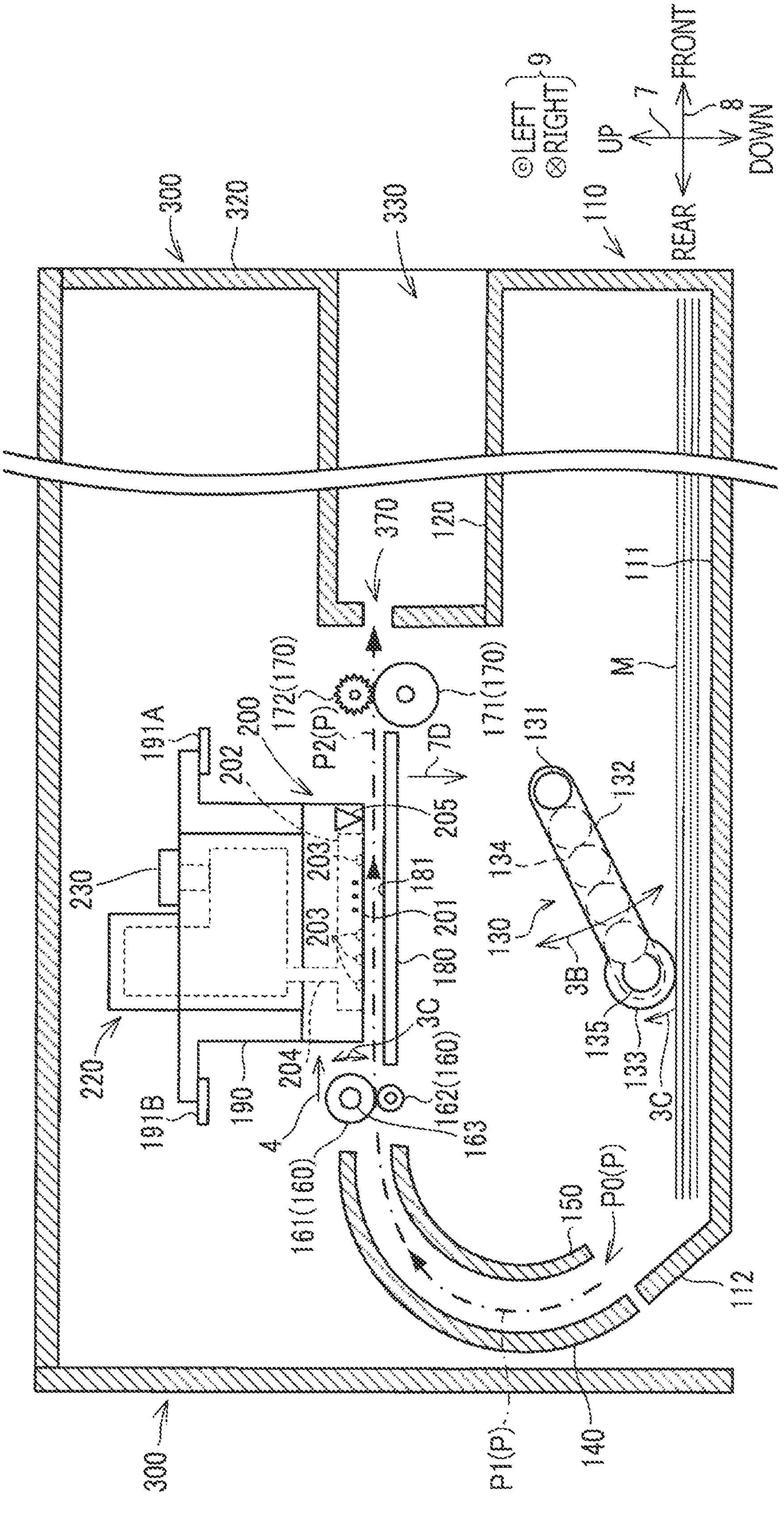
FIG. 2 is a cross-sectional view to illustrate an inner structure of the printer 100 according to the embodiment of the present disclosure.

The printer 100 as shown in FIG. 2 has a feeder tray 110, an ejection tray 120, a feeder 130, an outer guide 140, an inner guide 150, a conveyer roller pair 160, an ejection roller pair 170, a platen 180, a carriage 190, a head 200, a conveyer 210 (see FIG. 3), the reservoir section 220, lids 230, a valve unit 240 (see FIG. 5B), an opener member 250 (see FIGS. 4, 7), a cap 260 (see FIG. 4), and a controller 270 (see FIG. 9), which are accommodated in a housing 300. At least the conveyer 210, the valve unit 240, and the opener member 250 may form a first switching assembly, which will be described further below.

[Housing 300]

The housing 300 as shown in FIG. 1 may have a shape of an approximately rectangular cuboid. The housing 300 may be supported by frames, which are not shown, arranged inside. On the front face 320, the opening 330 being open frontward is formed.

[Feeder Tray 110]

The feeder tray 110 to store sheets M may be installed in the housing 300 through the opening 330. On a bottom 111 of the feeder tray 110, as shown in FIG. 2, one or more sheets M may be stacked in the vertical direction 7. From a rear end of the bottom 111, a guide member 112 extends upper-rearward to a position closely below a lower end of the outer guide 140.

[Ejection Tray 120]

In the housing 300, at a position above the feeder tray 110, a sheet outlet 370 is formed. Through the sheet outlet 370, the sheet M, on which an image is recorded in the printer 100, may be ejected. The sheet M with the image recorded thereon may be called as a printed material M. The ejection tray 120 is arranged at a lower-frontward position with respect to the sheet outlet 370. The ejection tray 120 may support the printed material M.

[Feeder 130]

The feeder 130 as shown in FIG. 2 includes a shaft 131, a feeder arm 132, a feeder roller 133, and a driving-force transmission assembly 134.

The shaft 131 is supported by a frame, which is not shown, and extends in the widthwise direction 9 at a position above the bottom 111. The feeder arm 132 is supported by the shaft 131 at a basal end part thereof. The feeder arm 132 is pivotable in a circumferential direction 3B of the shaft 131. The feeder arm 132 extends lower-rearward from the basal end part. The feeder roller 133 is attached to a tip end part of the feeder arm 132. The feeder roller 133 is rotatable in a circumferential direction 3C of a shaft 135, which is parallel to the shaft 131. The driving-force transmission assembly 134 may include a gear train and a driving belt and may be arranged inside the feeder arm 132.

Overall behaviors of the feeder 130 are herein described. The feeder roller 133 may contact an uppermost one of the sheets M stacked on the bottom 111 of the feeder tray 110. The driving-force transmission assembly 134 may transmit a force, generated by a feeder motor 271 (see FIG. 9) for feeding the sheets M, to the feeder roller 133. The feeder roller 133 may be rotated by the transmitted force and apply a rearward conveying force to the uppermost sheet M. Thereby, the uppermost sheet M may be conveyed rearward on the bottom 111 and guided by an inclined surface of the guide member 112 to a conveyer path P through a sheet inlet P0.

[Conveyer Path P]

As shown in FIG. 2, inside the housing 300, the conveyer path P to convey the sheet M is formed. The sheet inlet P0 forms an upstream end of the conveyer path P and is arranged immediately above the extended end of the guide member 112. The conveyer path P is a so-called U-turn path and includes a curved path P1 and a linear path P2. The curved path P1 curves substantially upper-frontward from the sheet inlet P0. The linear path P2 extends substantially linearly frontward from a downstream end of the curved path P1 to the sheet outlet 370.

[Outer Guide 140, Inner Guide 150]

The outer guide 140 and the inner guide 150 delimit an outermost part and an innermost part of the curved path P1, respectively.

Conveyance of the sheet M is herein described. The sheet M fed to the sheet inlet P0 may be guided by the outer guide 140 and the inner guide 150 to be conveyed in the curved path P1. Thereafter, the sheet M may be passed to the conveyer roller pair 160.

[Conveyer Roller Pair 160]

The conveyer roller pair 160 includes a driving roller 161 and a pinch roller 162. The driving roller 161 and the pinch roller 162 are arranged to contact each other in the vertical direction 7 across a downstream end part of the curved path P1 and extend in the widthwise direction 9 along the downstream end part of the curved path P1. The driving roller 161 in the present embodiment contacts the pinch roller 162 from above. Optionally, however, the driving roller 161 may contact the pinch roller 162 from below.

The driving roller 161 may rotate by a force generated by a conveyer motor 272 (see FIG. 9) for conveying the sheets M. The pinch roller 162 may be rotated by the rotation of the driving roller 161. The driving roller 161 and the pinch roller 162 may nip the sheet M and rotate to convey the sheet M in a conveying orientation 4, e.g., frontward. Thereby, the sheet M may be conveyed downstream in the linear path P2.

[Ejection Roller Pair 170]

As shown in FIG. 2, the ejection roller pair 170 includes a driving roller 171 and a spur roller 172. The driving roller 171 and the spur roller 172 are located at a position between the platen 180 and the sheet outlet 370 in the linear path P2 across the linear path P2 to contact each other in the vertical direction 7 and extend in the widthwise direction 9 along the linear path P2. The spur roller 172 in the present embodiment contacts the driving roller 171 from above. Optionally, however, the spur roller 172 may contact the driving roller 171 from below.

The driving roller 171 may rotate by the force generated by the conveyer motor 272. The spur roller 172 may be rotated by the rotation of the driving roller 171. The driving roller 171 and the spur roller 172 may nip the sheet M and rotate to convey the sheet M further downstream in the conveying orientation 4. Thereby, the sheet M may be ejected outside through the sheet outlet 370.

[Platen 180]

The platen 180 is located between the conveyer roller pair 160 and the ejection roller pair 170 in the front-rear direction 8. The platen 180 has a supporting surface 181 spreading in the front-rear direction 8 and the widthwise direction 9. The supporting surface 181 delimits a lowermost part of the linear path P2 and may support the sheet M conveyed by the conveyer roller pair 160 from below. The supporting surface 181 may be formed of upper-end faces of a plurality of ribs protruding upward from the platen 180 and longitudinally extending in the front-rear direction 8. Optionally, however, the supporting surface 181 may be a plain upper surface of the platen 180.

[Carriage 190]

Figure 3:
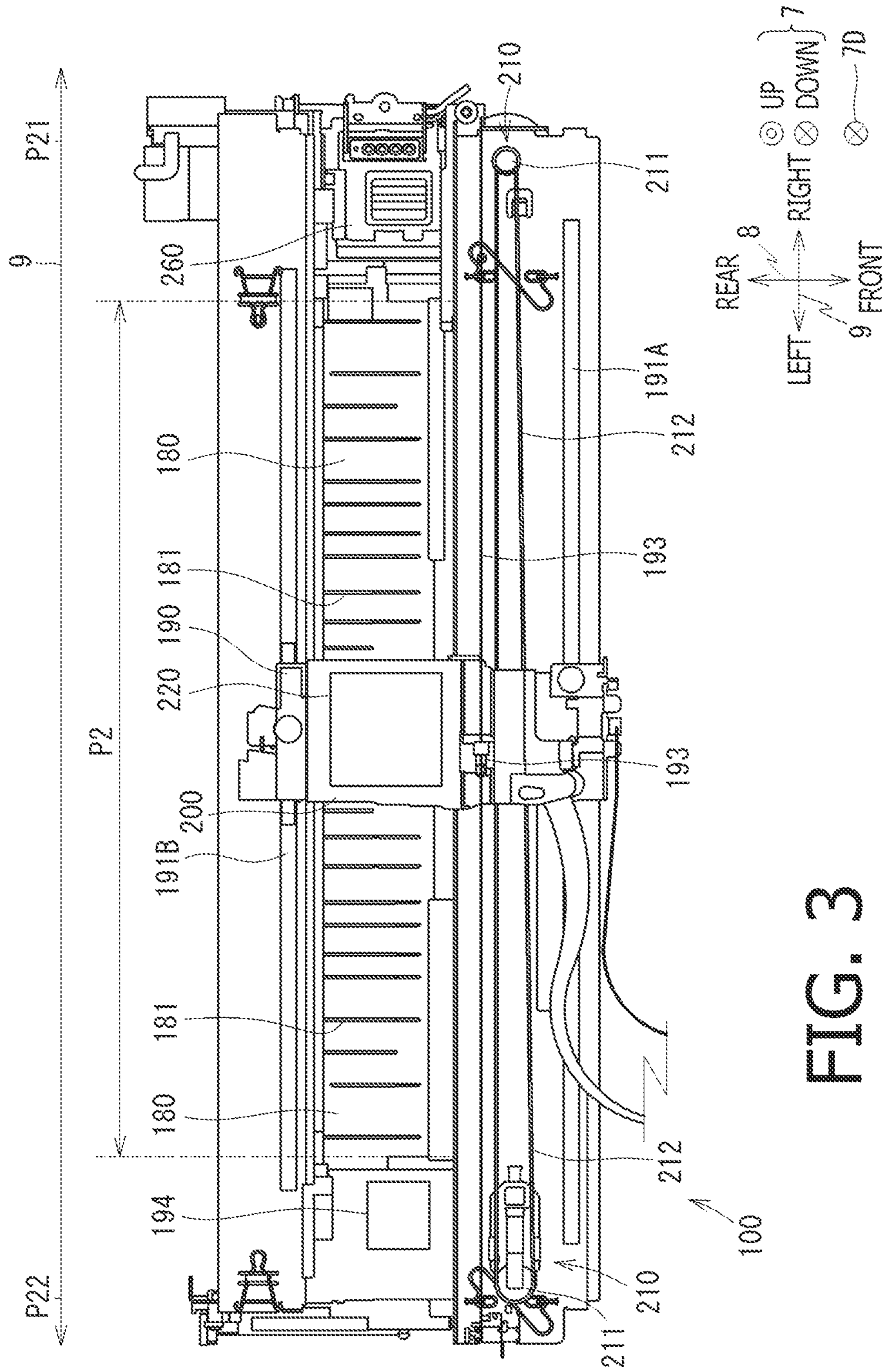
FIG. 3 is a top plan view showing an area in the inner structure, including a reservoir section 220 and a neighboring structure, according to the embodiment of the present disclosure.

The printer 100 as shown in FIGS. 2-3 further has guide rails 191A, 191B arranged inside the housing 300. As shown in FIG. 2, the guide rails 191A, 191B are located at positions higher than the supporting surface 181 and are supported by a frame, which is not shown. In a top plan view, as shown in FIG. 3, the guide rails 191A, 191B are arranged to be spaced apart in the front-rear direction 8 to flank the supporting surface 181 and longitudinally extend in the widthwise direction 9. In other words, between the guide rails 191A, 191B in the front-rear direction 8, the supporting surface 181 of the platen 180 is located.

The carriage 190, as shown in FIG. 3, has a width smaller than a width of the platen 180 and is arranged over the guide rails 191A, 191B in the front-rear direction 8. The carriage 190 may move on the guide rails 191A, 191B by the force transmitted through the conveyer 210 to reciprocate in the widthwise direction 9. In the following paragraphs, the direction in which the carriage 190 is movable may be called as a scanning direction 9.

[Head 200]

The head 200 as shown in FIG. 2 has a lower face 201, an upper face 202, a plurality of nozzles 203, and ink flow paths 204. The plurality of nozzles 203 are formed to align along the front-rear direction 8 and the widthwise direction 9 on the lower face 201. In FIG. 2, among the plurality of nozzles 203, merely nozzles 203 aligning along the front-rear direction 8 are shown. Each nozzle 203 has a downward discharging opening. The head 200 is mounted on the carriage 190 so that the lower face 201 of the head 200 may move in the scanning direction 9 along with the carriage 190 in a position separated above from the supporting surface 181. In this regard, the lower face 201 delimits an uppermost part of the linear path P2.

The head 200 accommodates piezoelectric devices (not shown), which correspond to the nozzles 203 on one-to-one basis. Driving waveforms modulated by the controller 270 may be applied to the piezoelectric devices in the head 200, and thereby the head 200 may discharge the ink and consume the ink stored therein through the nozzles 203 in a discharging orientation 7D, i.e., downward.

[Conveyer 210 (A Part of First Switching Assembly)]

The conveyer 210 as shown in FIG. 3 includes two (2) pulleys 211 and an endless belt 212. The conveyer 210 forms a part of the first switching assembly and may switch states of a valve body 242, which will be described further below, between an opening state and a closing state. The pulleys 211 are separated on the guide rail 191A from each other in the widthwise direction 9. Each pulley 211 may rotate in a circumferential direction of an axis thereof, which extends along the vertical direction 7. The endless belt 212 is strained around the pulleys 211 and is coupled to the carriage 190. One of the pulleys 211, e.g., the pulley 211 on the right, is coupled to a carriage motor 273 (see FIG. 9) for driving the carriage 190. The carriage motor 273 may operate under control of the controller 270 and generate a driving force. The pulley 211 on the right may be driven by the driving force from the carriage motor 273 to rotate in either a normal direction or a reverse direction. Therefore, the head 200 coupled to the endless belt 212 may reciprocate in the widthwise direction 9 between a capped position P21 and a flushing position P22, which are set in advance between the pulleys 211. The capped position P21 may be at substantially the same position in the widthwise direction 9 as the cap 260, which is separated rightward from the platen 180 and leftward from a frame 301 (see FIG. 4). The flushing position P22 is separated leftward from the platen 180. An ink receiver 194 is arranged at the flushing position P22.

The head 200 may move above an ink dischargeable range R11 (see, for example, FIG. 7), which will be described further below, while the carriage 190 moves leftward or rightward in a swath or a pass under the control of the controller 270. The head 200 and the ink reservoir chamber 220B are connected through the ink flow paths 204 allowing the liquid to flow therein. While moving in the widthwise direction 9, the head 200 may discharge the inks supplied through the ink flow paths 204 from the reservoir section 220. In other words, a line of image for a pass may be recorded on the sheet M.

[Reservoir Section 220, Lids 230]

Figure 4:
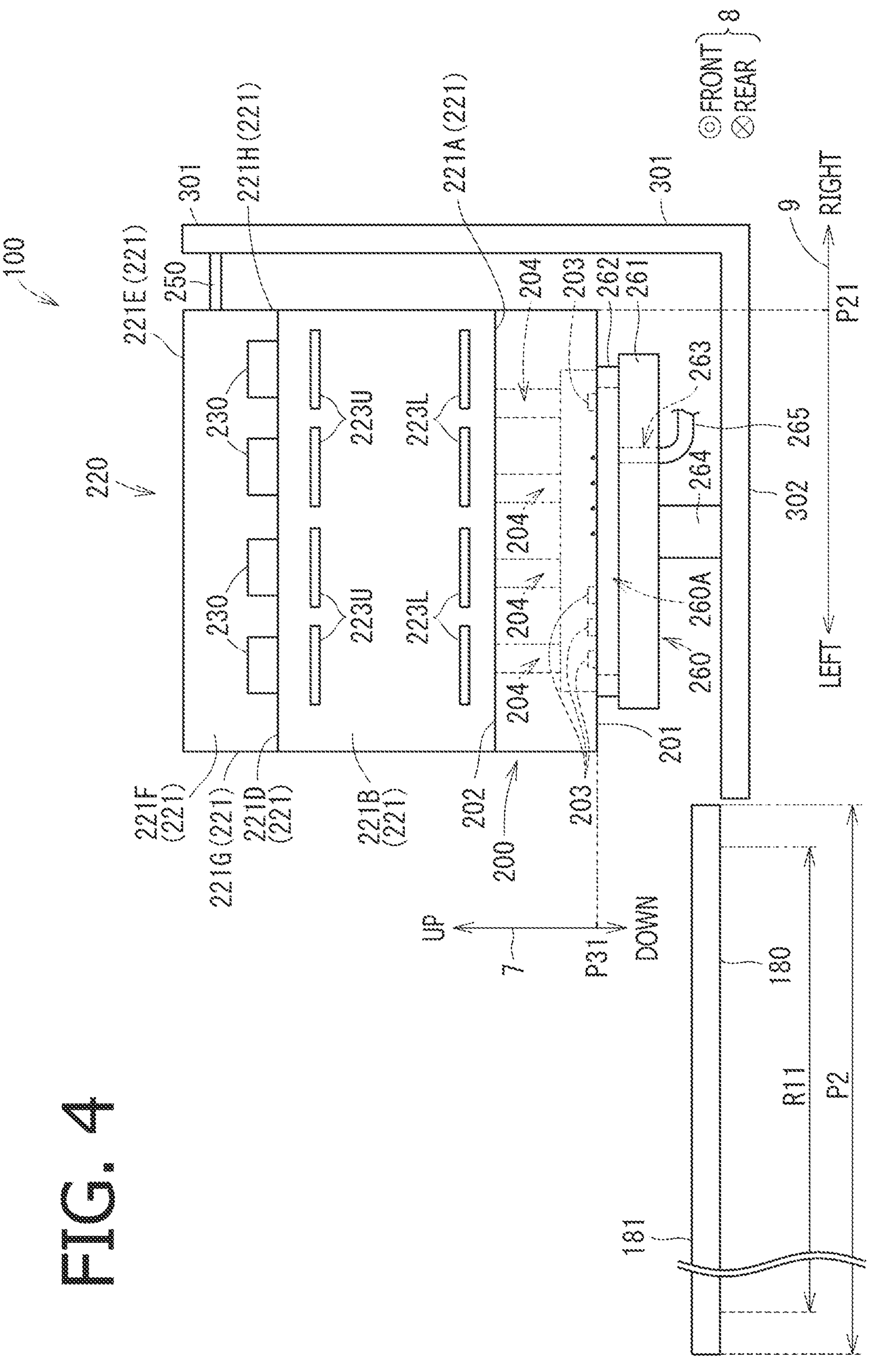
FIG. 4 is an illustrative view of the reservoir section 220 and the neighboring structure viewed from a front side, when a head 200 is located at a capped position P21, according to the embodiment of the present disclosure.

The reservoir section 220 being an ink tank is attached to the upper face 202 of the head 200, as shown in FIGS. 4, 5A, and 6B, so that the reservoir section 220 may not be detached from the head 200 easily. In other words, the printer 100 in the present embodiment may be a so-called on-carriage printer, in which the reservoir section 220 and the head 200 are mounted on the carriage 190 (see FIG. 3). The reservoir section 220 may be located entirely at an upper position with respect to the head 200. Optionally, however, the reservoir section 220 may be at least partly located above the upper face 202 of the head 200, and another part of the reservoir section 220 may be located below the upper face 202 of the head 200.

The reservoir section 220 has, as shown in FIGS. 4 and 5A, an outer wall 221, four (4) upper indexes 223U, four (4) lower indexes 223L, and four (4) lids 230. Moreover, the reservoir section 220 has, as shown in FIG. 6A, a plurality of divider walls 222 and a cylindrical wall 224.

Figure 5B:
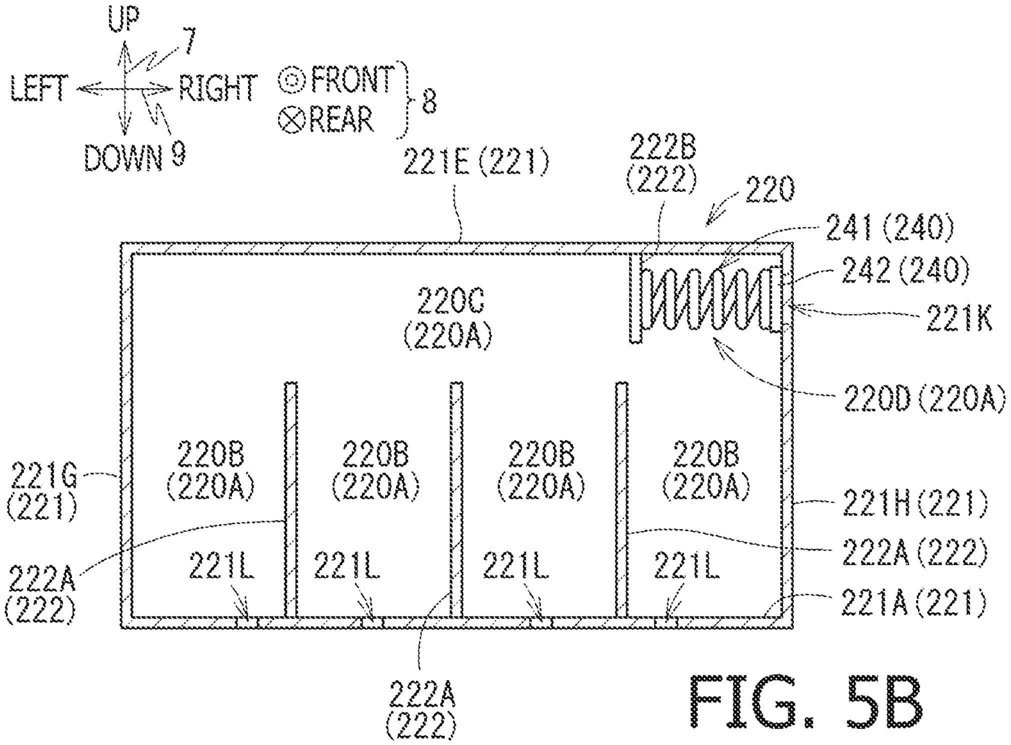
FIG. 5B is an illustrative view of a vertical cross-section C1 of the reservoir section 220, sectioned at a dash-and-dot line VB-VB indicated in FIG. 5A and viewed from a front side, according to the embodiment of the present disclosure.

As shown in FIGS. 5B and 6A-6B, the outer wall 221 delimits an inner space 220A of the reservoir section 220 from an external surrounding. The reservoir section 220 may be mainly made of a translucent material, e.g., transparent resin. Therefore, a user may visually recognize amounts of the inks stored in the reservoir section 220.

As shown in FIGS. 4, 5A-5B, and 6A, the outer wall 221 includes a bottom wall 221A, a first front wall 221B, a rear wall 221C, a first upper wall 221D, a second upper wall 221E, a second front wall 221F, a left-side wall 221G, and a right-side wall 221H. The bottom wall 221A, the first upper wall 221D, and the second upper wall 221E are in substantially rectangular forms in a plan view along the vertical direction 7. The first front wall 221B, the second front wall 221F, and the rear wall 221C are substantially in rectangular forms in a view along the front-rear direction 8.

The bottom wall 221A spreads on the upper face 202 of the head 200. A frontward edge and a rearward edge of the bottom wall 221A are substantially parallel to the front-rear direction 8.

The first front wall 221B and the rear wall 221C extend upward from the front edge and the rear edge of the bottom wall 221A, respectively. An extended end, i.e., an upper end, of the first front wall 221B is located to be lower than an extended end of the rear wall 221C.

The first upper wall 221D spreads between the upper end of the first front wall 221B and an intermediate position P41 (see FIG. 5A), which is between the first front wall 221B and the rear wall 221C. The second upper wall 221E spreads between an upper end of the rear wall 221C and the intermediate position P41.

In the first upper wall 221D, as shown in FIG. 6A, four (4) through holes 221J, through which the ink may be injected into the reservoir section 220, are formed through the first upper wall 221D in the vertical direction 7.

As shown in FIGS. 4 and 5A, the second front wall 221F spreads between a rear edge of the first upper wall 221D and a front edge of the second upper wall 221E.

The left-side wall 221G and the right-side wall 221H, as shown in FIG. 4, close the leftward end and the rightward end of the reservoir section 220, respectively.

Next, the plurality of divider walls 222 will be described with reference to FIGS. 5B and 6A. FIG. 5B shows a vertical cross-section C1 of the reservoir section 220, sectioned at a dash-and-dot line VB-VB indicated in FIG. 5A. FIG. 6A shows a vertical cross-section C2 of the reservoir section 220, sectioned at a dash-and-dot line VI-VI indicated in FIG. 5A. The vertical cross-sections C1, C2 are both parallel to the vertical direction 7 and to the widthwise direction 9. The vertical cross-section C1 spreads from the second upper wall 221E to the bottom wall 221A, and the vertical cross-section C2 spreads from upper ends of the lids 230 to the bottom wall 221A.

The plurality of divider walls 222 include three (3) vertical divider walls 222A and a vertical divider wall 222B, which delimit the inner space 220A, together with the outer wall 221, into four (4) ink reservoir chambers 220B, an air chamber 220C, and a valve accommodating space 220D.

The vertical divider walls 222A align spaced apart from one another in the widthwise direction 9 in the inner space 220A. In particular, the vertical divider walls 222A extend upward from the bottom wall 221A at different positions and spread in the front-rear direction 8 and the vertical direction 7. Each of the vertical divider walls 222A is connected to the first upper wall 221D (see FIG. 6A) at a position between two adjoining through holes 221J in the widthwise direction 9. Meanwhile, none of the vertical divider walls 222A is connected to the second upper wall 221E (see FIG. 5B). In other words, the extended ends of the vertical divider walls 222A are separated below from the second upper wall 221E. Each vertical divider wall 222A is connected to the first front wall 221B at a front end thereof and to the rear wall 221C at a rear end thereof. None of the vertical divider walls 222A is connected to the second front wall 221F.

The vertical divider wall 222B extends downward from the second upper wall 221E at a position separated leftward from the right-side wall 221H and spreads in the vertical direction 7 and the front-rear direction 8. The vertical divider wall 222B extends in the vertical direction 7 to a position separated above from the extended ends of the vertical divider walls 222A.

The four ink reservoir chambers 220B are spaces enclosed by the bottom wall 221A, the first front wall 221B, the rear wall 221C, the first upper wall 221D, the left-side wall 221G, the right-side wall 221H, the three vertical divider walls 222A. The four ink reservoir chambers 220B may store inks in four (4) different colors (e.g., yellow, magenta, cyan, and black). Each ink reservoir chamber 220B is connectable with the outside of the reservoir section 220 through a corresponding one of the through holes 221J.

The air chamber 220C is a space enclosed by the second front wall 221F, the rear wall 221C, the second upper wall 221E, the left-side wall 221G, and the right-side wall 221H. The air chamber 220C is located at an upper position with respect to the upper indexes 223U. The air chamber 220C may store at least a part of the air, i.e., an air portion, in the reservoir section 220. Optionally, the air chamber 220C may be enclosed by another divider wall(s) or may be a so-called labyrinth flow path.

As shown in FIG. 5B, the valve accommodating space 220D is a space delimited by the second upper wall 221E, the right-side wall 221H, and the vertical divider wall 222B and accommodates the valve unit 240. A lower side of the valve accommodating space 220D is open downward.

Therefore, the valve accommodating space 220D is continuous with the ink reservoir chambers 220B through the air chamber 220C.

The upper indexes 223U, as shown in FIG. 4, are arranged on an outer surface of the first front wall 221B at a position in proximity to the upper edge of the first front wall 221B. Each of the upper indexes 223U is arranged on a front side of a corresponding one of the ink reservoir chambers 220B. The upper indexes 223U are located at a same position in the vertical direction 7 and spaced apart from one another to align in the widthwise direction 9.

The lower indexes 223L are arranged on the outer surface of the first front wall 221B at a position lower than the upper indexes 223U. Each of the lower indexes 223L is arranged at a lower position with respect to a corresponding one of the upper indexes 223U. The lower indexes 223L are located at a same position in the vertical direction 7 and spaced apart from one another to align in the widthwise direction 9.

Each of the upper indexes 223U and the lower indexes 223L has a linear form extending in the widthwise direction 9. The upper indexes 223U and the lower indexes 223L may be marked on the outer surface of the first front wall 221B by engraving, embossing, or painting in a colorant. Each of the upper indexes 223U is a sign indicating a surface level of a maximum amount of the ink storable in the ink reservoir chambers 220B that are behind the upper indexes 223U. Each of the lower indexes 223L is a sign indicating a surface level of the ink, at which the ink reservoir chamber 220B should be refilled with the ink.

As shown in FIG. 6A, the cylindrical walls 224 cylindrically extend upward and downward from circumferential edges of the through holes 221J in the first upper wall 221D. Each cylindrical wall 224 has an injection port 224A at an upper end thereof. In other words, an upper end of each cylindrical wall 224 forms an injection port 224A. The injection port 224A is an opening which is open upward, or outward, from the reservoir section 220. An inner circumferential surface of each cylindrical wall 224 delimits an ink supplying path 224B, which continues from the injection port 224A through the through hole 221J to the ink reservoir chamber 220B. In other words, the injection port 224A is continuous with the ink reservoir chamber 220B, and the ink supplying path 224B connects the inside and the outside of the ink reservoir chamber 220B. Lower ends of the ink supplying paths 224B are located to be lower than the air chamber 220C.

The lids 230 shown in FIGS. 4 and 6A may be formed of, for example, flexible resin. The lids 230 are attachable to and detachable from upper ends of the cylindrical walls 224 by the user to close and open the injection ports 224A.

As shown in FIG. 5B, a first atmosphere communication path 221K is formed in the right-side wall 221H at a position coincident with the vertical divider wall 222B in the widthwise direction 9. The first atmosphere communication path 221K is a through hole formed through the right-side wall 221H in the widthwise direction 9. The first atmosphere communication path 221K connects the ink reservoir chambers 220B and the outside of the reservoir section 220 through the valve accommodating space 220D and the air chamber 220C.

In the bottom wall 221A, four (4) outflow ports 221L are formed at positions coincident with lower ends of the four ink reservoir chambers 220B. Each of the outflow ports 221L is a through hole holes-formed vertically through the bottom wall 221A and is continuous with a corresponding one of the ink flow paths 204. Through the outflow ports 221L, the inks in the ink reservoir chambers 220B may be supplied to the head 200. In the present embodiment, the air chamber 220C is entirely located to be higher than the outflow ports 221L. Optionally, however, the air chamber 220C may be at least partly located at an upper position with respect to the outflow port 221L.

[Valve Unit 240, Opener Member 250 (Part of First Switching Assembly)]

As shown in FIG. 5B, the valve unit 240 has a spring 241 and the valve body 242.

The spring 241 may be a compressive coil spring, of which natural length is substantially equal to or larger than a distance between the right-side wall 221H and the vertical divider wall 222B in the widthwise direction 9. The spring 241 is accommodated in the valve accommodating space 220D with an axis thereof aligning in parallel with the widthwise direction 9. A leftward end of the spring 241 is fixed to the vertical divider wall 222B. To a rightward end of the spring 241, the valve body 242 is fixed.

The valve body 242 may, when the opener member 250 is not contacting the valve body 242, with an inner surface of the right-side wall 221H serving as a valve seat, close the first atmosphere communication path 221K by an urging force of the spring 241. Thereby, the first atmosphere communication path 221K is placed in a disconnecting state, in which the ink reservoir chambers 220B and the outside of the reservoir section 220 are disconnected.

A frame 301, as shown in FIG. 4, is arranged inside the housing 300. The frame 301 extends in the vertical direction 7 at a position separated rightward from the cap 260 and faces the right-side wall 221H of the reservoir section 220 in the widthwise direction 9. The opener member 250 protrudes leftward from the frame 301 at a position coincident with the first atmosphere communication path 221K (see FIGS. 5A-5B) in the widthwise direction 9. A cross-sectional area of the opener member 250 at a section along the vertical direction 7 and the front-rear direction 8 is smaller than the opening of the first atmosphere communication path 221K throughout an entire range in the widthwise direction 9. A length of the opener member 250 in the widthwise direction 9 is greater than a distance between the valve body 242 when the head 200 is at the capped position P21 and the frame 301. When the carriage 190 moves in the widthwise direction 9, and shortly before the head 200 on the carriage 190 reaches the capped position P21, a protrusive end of the opener member 250 may enter the first atmosphere communication path 221K and contact the valve body 242. While the head 200 stays in the capped position P21, the valve body 242 is separated from the right-side wall 221H by a contacting force from the opener member 250 against the urging force of the spring 241. Therefore, the valve body 242 may open the first atmosphere communication path 221K. In other words, the opener member 250 may switch the valve body 242 from the closing state to the opening state. Thus, the valve body 242 may switchably open and close the first atmosphere communication path 221K. Accordingly, the first atmosphere communication path 221K may be placed in a connecting state, in which the ink reservoir chambers 220B and the outside of the reservoir section 220 are connected to communicate.

[Cap 260]

As shown in FIGS. 4 and 7, the cap 260 is located at a position rightward with respect to the platen 180 in the widthwise direction 9 and substantially the same in the front-rear direction 8 as the head 200. The cap 260 may be formed of an elastic material such as rubber and has a base portion 261, a lip portion 262, and a plurality of fluid communication paths 263. The base portion 261 and the lip portion 262 may form a body of the cap 260. The fluid communication paths 263 may form a part of a second atmosphere communication path, which will be referred to further below.

The base portion 261 has an approximately rectangular upper surface in a plan view along the vertical direction 7. The lip portion 262 protrudes upward from an upper surface of the base portion 261 at positions in the vicinity of circumferential edges and has a form of a rectangular frame. The base portion 261 and the lip portion 262 delimit a covering space 260A, through which the entire nozzles 203 formed in the head 200 may be covered with the cap 260. The plurality of fluid communication paths 263 are through holes formed at positions in an area enclosed by the lip portion 262 through the base portion 261 from the upper surface to a lower surface. Optionally, solely one fluid communication path 263 rather than a plurality of fluid communication paths 263 may be formed. In FIGS. 4 and 7, solely one of the fluid communication paths 263 is shown.

The cap 260 is supported by a frame 302, which spreads in the front-rear direction 8 and the widthwise direction 9, through a lift assembly 264. The lift assembly 264 may move the cap 260 vertically between a capping position P31 and an uncapping position P32 by a driving force generated under control of the controller 270 by a lift motor 274 (see FIG. 9). The capping position P31 is a position, at which an upper end of the lip portion 262 contacts the lower face 201 of the head 200 being located at the capped position P21, as shown in FIG. 4. The base portion 261 and the lip portion 262 of the cap 260 located at the capping position P31 may cover the nozzles 203 formed in the lower face 201 of the head 200. The uncapping position P32 is lower than the capping position P31 and is a position, at which the upper end of the cap 260 is separated from the lower face 201 of the head 200, as shown in FIG. 7.

[Second Switching Assembly 280]

As shown in FIG. 8, the printer 100 has a second switching assembly 280. The second switching assembly 280 includes common tubes 281, solely one of which is shown, an electric-operable three-way valve 282, and individual tubes 283, 284. Each common tube 281 is connected to a lower end of one of the fluid communication paths 263 at one end thereof and connected to an inflow port 282A of the electric-operable three-way valve 282 at the other end thereof. The electric-operable three-way valve 282 and the individual tube 283 may form another part of the second atmosphere communication path, which will be referred to further below.

The electric-operable three-way valve 282 has, additionally to the inflow port 282A, two (2) outflow ports 282B, 282C and a valve body (not shown) in a valve box. The individual tube 283 is connected to the outflow port 282B at one end thereof, and the other end of the individual tube 283 is open to the atmosphere. The individual tube 284 is connected to the outflow port 282C at one end thereof and to an inlet port 290A of a tube pump 290 at the other end thereof.

The valve body of the electric-operable three-way valve 282 is movable between a first valve position and a second valve position, which are not shown, under the control of the controller 270 (see FIG. 9). The first valve position is a position, at which the valve body allows fluid, in particular, the air, to flow from the inflow port 282A to the outflow port 282B. The second valve position is a position, at which the valve body allows fluid, in particular, waste ink, to flow from the inflow port 282A to the outflow port 282C.

[Tube Pump 290]

The tube pump 290 may be, for example, a rotary tube pump, and has the inlet port 290A and an outlet port 290B. A waste ink tank (not shown) is connected to the outlet port 290B through a waste ink tube 291, which allows the fluid to flow therein.

[Volume Vb of Air Portion]

Next, with reference to FIG. 6B, a volume Vb of an air portion will be described. The air portion is a part of the inner space 220A, i.e., a cavity, not occupied by the inks. The volume Vb is a volume of the air portion when surfaces of the inks are at the substantially same vertical position as the upper indexes 223U. The volume Vb may be determined while being designed by a manufacturer in a following manner.

While the valve body 242 (see FIG. 5B) closes the first atmosphere communication path 221K, in other words, while the first atmosphere communication path 221K is in the disconnecting state, a discharging process may be conducted under the control of the controller 270. The discharging process is a process, in which the head 200 discharges the inks at the sheet M on the supporting surface 81 to record a specific image based on specific image data under a specific condition. This discharging process will be described further below. During the discharging process, as the time proceeds, with the first atmosphere communication path 221K in the disconnecting state, the inks in the ink reservoir chambers 220B may be consumed, and the volume of the air portion may increase; therefore, the air pressure in the air portion may decrease.

Meanwhile, the printer 100 may conduct a flushing action before or during the image is recorded on the sheet M in the discharging process. In particular, the head 200 may, under the control of the controller 270, discharge the inks through the nozzles 203 at the ink receiver 194. Therefore, the volume of the air portion may increase even more by the flushing action, and the air pressure in the air portion may decrease, as the time proceeds. In the present embodiment, the discharging process includes acts of the controller 270 for the flushing action.

In this regard, duration of the discharging process may be a factor to change the air pressure in the reservoir section 220.

In the present embodiment, the air pressure of the air portion in the reservoir section 220 when the first atmosphere communication path 221K is in the disconnecting state, i.e., one atmosphere (1 atm), may be represented by a sign Po. While a change in the volume of the air portion due to a change in volumes of the inks caused by the discharging process may be represented by a sign $\Delta V$. and a change in the pressure of the air portion may be represented by a sign $\Delta P$, the volume Vb is controlled to satisfy a formula: $Yb=(Po+\Delta P)*\Delta V/\Delta P$ . . . (1).

Moreover, while a pressure resistance of the menisci formed with the inks in the nozzles 203 may be represented by a sign Pm, $\Delta P$ satisfies a formula: $\Delta P \leq Pm$ . . . (2).

The pressure resistance Pm may be predetermined based on the specifications of the inks and the head 200. In order to calculate the pressure resistance Pm of the ink menisci, surface tension of the authentic inks provided by the manufacturer or distributor of the printer 100 and the contact angle with the authentic inks may be used. In particular, if a diameter of each nozzle 203 is d, the surface tension of the inks may be represented by a sign $\sigma$, and the contact angle of the inks at the lower face 201 of the nozzles 203 may be represented by a sign $\theta$, Pm may be obtained from a formula:

$Pm=4*\sigma*\cos\theta/d$ . . . (3). Meanwhile, the diameter d of the nozzle 203 may be based on an exit diameter of the nozzle 203.

The surface tension σ may be obtained, for example, by the Wilhelmy method. The contact angle θ may be the contact angle when an ink is dropped on the lower face 201, which is the flat ink discharge surface, and may be obtained by, for example, the θ/2 method.

The specific image is a multicolor pattern image defined in ISO/IEC 24734, which is established by the International Organization for Standardization. The color pattern image is an image defined in ISO/IEC 24734, and is described in image data in a predetermined data format (doc format, xls format, pdf format, etc.).

The specific condition is recording the specific image continuously for 30 seconds on a sheet in A4-size in the standard mode defined in ISO/IEC 24734. The specific condition includes, in particular, a resolution (CR×LF) and a margin size. The resolution may be, for example, 600×300 dpi. In a case of the doc format, the margin size is 34.3 mm on each of the top and the bottom, and 29.2 mm on each of the left and the right sides of the sheet. In a case of the xls format, the margin size is 3 mm on each of the top and the bottom, and 3 mm on each of the left and the right sides of the sheet.

[Controller 270]

As shown in FIG. 9, the controller 270 includes a CPU, a ROM, a RAM, an EEPROM, and an ASIC, which are mutually connected through internal buses. The ROM may store programs to control the operations in the printer 100. The CPU may run the programs with use of the RAM and the EEPROM.

The ASIC is electrically connected with the motors 271-274. The ASIC may generate and output controlling signals V21, V22, V23, V24 to rotate the feeder motor 271, the conveyer motor 272, the carriage motor 273, and the lift motor 274, respectively. The ASIC is, moreover, electrically connected with the electric-operable three-way valve 282 and the tube pump 290. The ASIC may generate and output controlling signals V25 for locating the valve body of the electric-operable three-way valve 282 at one of the first valve position and the second valve position. Further, the ASIC may generate and output controlling signals V26 for activating the tube pump 290.

The controller 270 has a timer 275 as an internal circuit of the CPU. The timer 275 may, according to an instruction from the CPU, accumulate a time length from a point when a start command is input to a point when a stop command is input as duration. When the duration reaches a predetermined time threshold value, the timer 275 returns a response indicating the reach to the CPU. The time threshold value is set to a time length shorter than a time length that may cause the menisci in the nozzles 203 to collapse due to the increased negative pressure in the inner space 220A. The time length that may cause the menisci in the nozzles 203 to collapse may be determined in advance while the printer 100 is being designed by the manufacturer through, for example experiments. In the present embodiment, the time threshold value is 30 seconds or may be a time length including 30 seconds and an allowance.

[Image Recording Process by Controller 270]

When the printer 100 is standing by for image recording, the head 200, the cap 260, and the valve unit 240 are at positions shown in FIG. 4. In this arrangement, the head 200 is standing by at a home position, which may be, in the present embodiment, the capped position P21. Meanwhile, the capped position P21 may also be an origin point, from which the head 200 starts moving in the widthwise direction 9. Optionally, however, the home position may be any position between the platen 180 and the cap 260 in the widthwise direction 9 or may be at a position rightward with respect to the cap 260. The cap 260 stays at the capping position P31 and covers the nozzles 203 of the head 200. The valve body 242 is subject to the contacting force of the opener member 250 and opens the first atmosphere communication path 221K to place the first atmosphere communication path 221K in the connecting state. The lids 230 close the injection ports 224A (see FIG. 6A).

When the printer 100 is standing by, the valve body of the electric-operable three-way valve 282 (see FIG. 8) is at the first valve position. Therefore, the covering space 260A is connected with the outside of the cap 260, in other words, with the atmosphere, through the fluid communication paths 263, i.e., the second atmosphere communication path, the electric-operable three-way valve 262, and the individual tube 283.

When the printer 100 is standing by or running an image recording process, the controller 270 may receive a print job and store the received print job in, for example, the RAM. A sender of the print job may be a personal computer or a smartphone which may communicate with the printer 100. The print job is an execution command for an image recording process and includes at least image data and setting information. The image data describes an image to be recorded in the image recording process. The image data may describe an image to be recorded on a single sheet M or a plurality of images to be recorded on a plurality of sheets M. The setting information describes settings for the image recording process including, for example, a print mode, a size of the sheet(s) M, margins on the sheet(s) M, and resolutions of the image(s).

The controller 270 may select one of print jobs stored in the RAM and start an image recording process (see FIGS. 10A-10B) based on the selected print job.

As shown in FIG. 10A, in S101, the controller 270 generates driving signals in the RAM based on the image data and the setting information. The driving signals may be used for driving the piezoelectric devices in the head 200 and are generated for the entire passes that are required to record the image described in the image data for each of the different-colored inks.

In S102, the controller 270 determines whether an execution condition to conduct a purging process is satisfied. For determining whether the execution condition is satisfied, known technologies may be applied. If the controller 270 determines that the execution condition is satisfied, the flow proceeds to S116, or if the controller 270 determines that the execution condition is not satisfied, the flow proceeds to S103.

In S103, the controller 270 conducts a separating process, a second-path disconnecting process, and a flushing process, in this recited order. In the present embodiment, two (2) examples of the flushing process are given below. Optionally, however, the second-path disconnecting process in S103 prior to the flushing process may be omitted.

The controller 270 conducts the separating process with the cap 260. In particular, the controller 270 outputs the controlling signals V24 to control the lift assembly 264 through the lift motor 274 to lower the cap 260 from the capping position P31 to the uncapping position P32 (see FIG. 7). Next, in the second-path disconnecting process, the controller 270 outputs the controlling signals V25, for shifting the position of the valve body of the electric-operable three-way valve 282 to the second valve position, to the electric-operable three-way valve 282. Therefore, the position of the electric-operable three-way valve 282 may be switched from the first valve position to the second valve position.

For a first example of the flushing process, the controller 270 may move the head 200 in the widthwise direction 9 to the flushing position P22. In particular, the controller 270 may output the controlling signals V23 to the carriage motor 273 to control the conveyer 210 to move the carriage 190 in the widthwise direction 9. While the carriage 190 is being moved, the controller 270 may determine an updated position of the head 200 based on signals output from a linear encoder 193 (see FIG. 3). Until the updated position matches the flushing position P22, the controller 270 may continue moving the head 200 in the widthwise direction 9 toward the flushing position P22. When the updated position of the head 200 matches the flushing position P22, the controller 270 may stop the head 200 at the flushing position P22 and control the head 200 staying over the ink receiver 194 to flush the ink at the ink receiver 194. The flushing process may be thus conducted. During the flushing process, the controller 270 may activate the timer 275 to count the time between the start of discharging the inks from the head 200 and the end of the discharging.

After the flushing process, the controller 270 may conduct a moving process, in which the controller 270 outputs the controlling signals V23 to the carriage motor 273 and moves the head 200 from the flushing position P22 to the home position, i.e., the capped position P21. Meanwhile, the controller 270 may monitor updated positions of the head 200 periodically and, when the updated position matches the capped position P21, the controller 270 may stop outputting the controlling signals V23. The controller 270 may exit S103 thereafter.

For a second example of the flushing process, the controller 270 may control the head 200 to discharge the ink at the cap 260 staying at the position above the cap 260, without moving the head 200 to the flushing position P22. The controller 270 may activate the timer 275 to count the duration from the start and the end of discharging the inks from the head 200. The controller 270 may exit S103 thereafter.

In S104, the controller 270 selects a unit of the driving signals stored in the RAM for a pass to be run in a discharging process in S108.

In S105, the controller 270 conducts a cueing process and controls one of the sheets M in the feeder tray 110 to be conveyed to a cueing position, which is a position in the linear path P2 straight below the sheet sensor 205 (see FIG. 2). The sheet sensor 205 may be arranged at a position in proximity to a front end of the lower face 201. The sheet sensor 205 being an optical sensor is arranged to face the supporting surface 181 of the platen 180.

In the cueing process, in particular, the controller 270 outputs the controlling signals V21 to the feeder motor 271 to control the feeder roller 133 to convey the sheet M in the curved path P1. Thereafter, the controller 270 outputs the controlling signals V22 to the conveyer motor 272 to control the conveyer roller pair 160 to convey the sheet M to the cueing position in the linear path P2. While outputting the controlling signals V22, the controller 270 obtains signals from the sheet sensor 205 periodically and stops outputting the controlling signals V22 in response to a change of levels of the obtained signals. Thus, the sheet M may pause on the supporting surface 181 with a frontward edge of the sheet M located at the cueing position.

In S106, the controller 270 determines an ink dischargeable range R11 (see FIG. 4) based on the size of the sheet M and the margin size contained in the setting information in the print job. The ink dischargeable range R11 is a range, in which the inks may be discharged at the sheet M on the supporting surface 181, and is a remainder of subtracting the margin size from each side of the sheet M.

In S107, the controller 270 outputs the controlling signals V23 to the carriage motor 273 to move the head 200 from the capped position P21 to a position straight above a discharge-start position in the ink dischargeable range R11. The discharge-start position is an initial position for the head 200 when an image for a single pass is to be recorded on the sheet M on the supporting surface 181.

Before S107, in other words, when the head 200 is located at the capped position P21, as shown in FIG. 4, the first atmosphere communication path 221K is in the connecting state. From this position, while the head 200 moves from the capped position P21 to the position above the ink dischargeable range R11 in S107, the valve body 242 separates from the opener member 250 and closes the first atmosphere communication path 221K by the urging force of the spring 241 (see FIGS. 5B and 7). Therefore, the first atmosphere communication path 221K is shifted to the disconnecting state. In other words, in S107, the first switching assembly may be controlled to operate, for arranging the discharging process (S108) to be conducted with the first atmosphere communication path 221K being in the disconnecting state.

In S107, moreover, the controller 270 conducts a measure-start process. In particular, as the controller 270 starts outputting the controlling signals V23, in other words, as the head 200 starts moving from the capped position P21, the controller 270 conducts the measure-start process, in which the controller 270 activates the timer 275 to start measuring time.

In S108, the controller 270 conducts a conveying process, in which the head 200 is conveyed in the scanning direction 9, i.e., the widthwise direction 9, and a discharging process. The conveying process to convey the head 200 in the scanning direction 9 may be hereinafter called as a scanning process. In particular, in the scanning process, the controller 270 outputs the controlling signals V23 to the carriage motor 273 to control the conveyer 210 to convey the head 200 in one way, i.e., rightward or leftward, in the scanning direction 9 for a pass.

The discharging process may be conducted with the first atmosphere communication path 221K being closed and while the controlling signals V23 are being output in the scanning process. In particular, while the head 200 is moving above the ink dischargeable range R11, the controller 270 applies the unit of driving signals selected in either S104 (see FIG. 10A) or S114 (see FIG. 10B) to the piezoelectric devices in the head 200. Therefore, the piezoelectric devices may be driven, and the ink may be discharged from the head 200 through the nozzles 203. Accordingly, the image for the pass along the scanning direction may be recorded on the sheet M.

Having finished outputting the driving signal in the pass, the controller 270 stops outputting the controlling signals V23. Moreover, the controller 270 commands the timer 275 to stop measuring. The controller 270 exits S108 thereafter.

In S109 (see FIG. 10B), the controller 270 conducts a condition determining process to determine whether a predetermined connection condition is satisfied. In particular, the controller 270 may determine whether the duration measured by the timer 275 reaches a time threshold value. More specifically, the controller 270 may determine whether the duration reached the time threshold value based on whether the controller 270 received the response from the timer 275 on or before S109. If the controller 270 did not receive the response from the timer 275, the controller 270 may determine that the duration does not reach the time threshold value and proceed to S111. If the controller 270 received the response from the timer 275, the controller 270 may determine that the duration reached the time threshold value and proceed to S110.

In S110, the controller 270 conducts a withdrawing process and an open-to-atmosphere process to move the head 200 to reciprocate in the scanning direction 9 between the updated position and the capped position P21. In particular, the controller 270 obtains the updated position of the head 200 based on the signals from the linear encoder 193 (see FIG. 3) and saves the updated position in, for example, the RAM, as a resume position for ink discharging process. Moreover, the controller 270 may move the head 200 rightward to withdraw to the capped position P21 (i.e., withdrawing process). When the head 200 reaches the capped position P21, the valve body 242 receiving the contacting force of the opener member 250 shifts the first atmosphere communication path 221K to the connecting state (i.e., open-to-atmosphere process). Thereafter, the controller 270 moves the head 200 leftward from the capped position P21 to return to the resume position. Furthermore, in S110, the controller 270 issues a reset command from the CPU to initialize the timer 275.

In S111, the controller 270 determines whether an entire image for the sheet M is completely recorded. When the controller 270 determines that the image recording is not completed, the controller 270 proceeds to S114, or when the controller 270 determines that the image recording is completed, the controller 270 proceeds to S112.

In S114, the controller 270 selects another unit of the driving signals for a next pass. Moreover, the controller 270 conducts an intermittent conveying process. In particular, in the intermittent conveying process, the controller 270 outputs the controlling signals V22 to the conveyer motor 272 to control the conveyer roller pair 160 to convey the sheet M in the conveying orientation 4, e.g., frontward, by a distance equal to a single pass in the conveying orientation 4 and controls the conveyer roller pair 160 to stop rotating. The controller 270 proceeds to S107 (see FIG. 10A).

In S112, the controller 270 conducts an ejecting process to eject the printed material M. In particular, the controller 270 may output the controlling signals V22 to the conveyer motor 272 to control the conveyer roller pair 160 and the ejection roller pair 170 to eject the printed material M through the sheet outlet 370 at the ejection tray 120.

In S113, the controller 270 determines whether image recording to record the entire images on the sheet M is completed. When the controller 270 determines that the image recording is not completed, the controller 270 proceeds to S103 (see FIG. 10A); or when the controller 270 determines that the image recording is completed, the controller 270 proceeds to S115.

In S115, the controller 270 conducts the moving process to move the head 200 to the capped position P21, a second-path connecting process, and a capping process, in this recited order.

The controller 270 conducts the moving process, in which the controller 270 moves the head 200 in the widthwise direction 9 to the capped position P21. While the head 200 moves toward the capped position P21, the valve body 242 contacts the opener member 250, and accordingly, the valve body 242 may open the first atmosphere communication path 221K against the urging force of the spring 241 to place the first atmosphere communication path 221K in the connecting state (see FIG. 4). In other words, in the moving process in S115, the first switching assembly may be controlled to operate to place the first atmosphere communication path 221K in the disconnecting state. Next, the controller 270 conducts the second-path connecting process, in which the controller 270 outputs the controlling signals V25, for shifting the position of the valve body of the electric-operable three-way valve 282 to the first valve position, to the electric-operable three-way valve 282. Therefore, the position of the valve body of the electric-operable three-way valve 282 is switched from the second valve position to the first valve position. Thereafter, the controller 270 conducts the capping process, in which the controller 270 outputs the controlling signals V24 to the lift motor 274 to lift the cap 260 upward from the uncapping position P32 to the capping position P31 (see FIG. 4) through the lift assembly 264. Thereafter, the controller 270 ends the image recording process shown in FIGS. 10A-10B.

In S116 (see FIG. 10A), the controller 270 conducts the second-path disconnecting process and the purging process in this recited order. The second-path disconnecting process may be conducted similarly to the second-path disconnecting process in S103. In the purging process, the controller 270 outputs the controlling signals V26 to the tube pump 290 to activate the tube pump 290. Accordingly, the inks in the head 200 may be expelled through the nozzles 203 at the cap 260 as waste inks. The waste inks may flow to the tube pump 290 through the fluid communication paths 263, the common tubes 281, the electric-operable three-way valve 282, the individual tube 284, and the inlet port 290A. The tube pump 290 may transport the collected waste inks outward through the outlet port 290B. The collected waste inks may be transported through the waste ink tube 291 to the waste ink tank.

Benefits

In the embodiment described above, while the cap 260 covers the nozzles 203, the first atmosphere communication path 221K and the fluid communication paths 263 being the second atmosphere communication path are both in the connecting states. Therefore, with the nozzles 203 being covered, even if the pressure of the air in the reservoir section 220 varies due to, for example, a temperature change, the air may be released outside, and the pressure may be moderated through the first atmosphere communication path 221K. Moreover, even if the pressure in the covering space 260A varies while the nozzles 203 are covered, the air may be released to the atmosphere through the fluid communication paths 263, and the pressure may be moderated. Therefore, the form of the menisci in the nozzles 203 may be maintained reliably.

The cap 206 may be made of a flexible material. Therefore, when the cap 260 contacts the lower face 201 of the head 200 for the capping process, the cap 206 may resiliently deform, and a volume of the covering space 260A may decrease. Meanwhile, the controller 270 conducts the second-path connecting process in S115 after the end of the discharging process in S108 and before beginning the capping process in S115. In this arrangement, during the capping process, the valve body of the electric-operable three-way valve 282 is at the first valve position; therefore, the pressure in the reservoir section 220 that may increase due to the deformation of the cap 260 and the reduction of the volume in the covering space 260A may be released through the fluid communication paths 263 and the common tubes 281. In other words, during the capping process, the pressure may be restrained from varying, and the menisci in the nozzles 203 may not be deformed or collapse easily.

In S103, the controller 270 conducts the separating process and the second-path disconnecting process in this recited order. In this arrangement, during the separating process, the valve body of the electric-operable three-way valve 282 is at the first valve position; therefore, during the separating process, even if the air pressure in the covering space 260A decreases, the pressure may be released through the fluid communication paths 263 and the common tubes 281. In other words, during the separating process, the pressure may be restrained from varying, and the menisci in the nozzles 203 may not be deformed or collapse easily. Moreover, after the separating process, the second-path disconnecting process locates the valve body of the electric-operable three-way valve 282 at the second valve position; therefore, the air be restrained from entering the fluid communication paths 263 or the common tubes 281. Accordingly, in the fluid communication paths 263 and the common tubes 281, the inks may be restrained from dehydrating.

In S116, the controller 270 switches the states of the fluid communication paths 263 being the second communication path from the connecting state to the disconnecting state through the second switching assembly 280, and thereafter activates the tube pump 290. In this arrangement, the inks in the head 200 may be securely discharged outside at the cap 260.

In S107, the controller 270 conducts the first-path disconnecting process and controls the first switching assembly to operate in preparation for the discharging process to be conducted in S108 with the first atmosphere communication path 221K being in the disconnecting state while the discharging process is being conducted in S108. Therefore, during the discharging process, the first atmosphere communication path 221K is in the disconnecting state. In this arrangement, while the inks are being consumed, the air pressure in the reservoir section 220 may be maintained negative. Therefore, even when the sheet M accidentally contacts the nozzles 203 during the discharging process, the inks may be restrained from leaking over the sheet M.

In S115, the controller 270 moves the head 200 to the capped position P21. The capped position P21 is a position, in which the head 200 may not face the sheet M. In a next round to conduct the image recording process shown in FIGS. 10A-10B, the controller 270 may conduct the flushing process in the second example in S103. In this arrangement, the controller 270 may control the head 200 to discharge the inks at the cap 260 in the position above the cap 260 without moving the head 200 to the flushing position P22. In other words, the controller 270 operates the first switching assembly for arranging the liquid to be discharged in the flushing action from the head 200 located at the capped position P 21 with the first atmosphere communication path 221K being in the connecting state prior to conducting the discharging process. Therefore, in comparison with the first example of the flushing process, the discharging process may be started earlier. Optionally, while the discharging process is being conducted, in response to a predetermined flushing condition being satisfied, the moving process to move the head 200 to the capped position P21 and the flushing process may be conducted.

Alternatively, the controller 270 may conduct the flushing process in the first example in S103 in FIG. 10A. In this arrangement, the controller 270 may move the head 200 to the flushing position P22 and operate the head 200 to discharge the inks at the ink receiver 194 in the position above the ink receiver 194. The flushing position P22 is another position, in which the head 200 may not face the sheet M. In other words, the controller 270 operates the first switching assembly for arranging the liquid to be discharged in the flushing action from the head 200 located at the flushing position P23 with the first atmosphere communication path 221K being in the disconnecting state. Therefore, while the inks are flushed out from the head 200, the air pressure in the reservoir section 220 may be maintained negative, and thereafter the inks may be discharged stably in the discharging process. Optionally, while the discharging process is being conducted, in response to a predetermined flushing condition being satisfied, the moving process to move the head 200 to the flushing position P22 and the flushing process may be conducted.

According to the embodiment described above, the reservoir section 220 has the plurality of ink reservoir chambers 220B and the first atmosphere communication path 221K connecting the inside and the outside of the ink reservoir chambers 220B. The first switching assembly may switch the states of the first atmosphere communication path 221K between the connecting state, in which the plurality of ink reservoir chambers 220B are collectively connected to the outside, and the disconnecting state, in which the plurality of ink reservoir chambers 220B are collectively disconnected from the outside. Therefore, the controller 270 may be released from burdens to switch states of the ink reservoir chambers 220B individually.

MODIFIED EXAMPLES

Although an example of carrying out the invention has been described, those skilled in the art will appreciate that there are numerous variations and permutations of the liquid discharging apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters. Described below will be modified examples of the present embodiment.

First Modified Example (Modified Example of Second Atmosphere Communication Path)

In the embodiment described above, the second atmosphere communication path consists of the fluid communication paths 263, the common tubes 281, the electric-operable three-way valve 282, and the individual tube 283. However, optionally, the cap 260 may have a second atmosphere communication path 265 as shown in FIG. 11A. In this arrangement, the lower end of the fluid communication path 263 and the inlet port 290A of the tube pump 29 may be connected through the individual tube 284. The second atmosphere communication path 265 may be a hole formed through the base portion 261 at a position different from the fluid communication path 263 from the upper surface to the lower surface of the base portion 261. The second atmosphere communication path 265 may be arranged in a form not allowing the inks discharged or flushed out from the head 200 to leak outside the cap 260. Optionally, moreover, an electromagnetic valve may be arranged at a lower end of the second atmosphere communication path 265. With the electromagnetic valve, states of the second atmosphere communication path 265 may be switched between a connecting state and a disconnecting state by the electromagnetic valve, similarly to the connecting state and the disconnecting state of the second switching assembly.

Second Modified Example (First Modified Example of Reservoir Section 220)

For another example, as shown in FIG. 11B, the inner space 220A in the reservoir section 220 may be delimited by the outer wall 221 and divided by divider walls 222A into four (4) sections, each of which has the ink reservoir chamber 220B and the air chamber 220C. In other words, the reservoir section 220 may include four (4) ink reservoir chambers 220B and four (4) air chambers 220C. In this arrangement, each ink reservoir chamber 220B may be connected with the outside of the reservoir section 220 through one of four (4) individual first atmosphere communication paths 221K individually. Moreover, to each of the air chambers 220C, an individual valve accommodating space 220D may be arranged at a rightward position with respect to the air chamber 220C. In each of the valve accommodating spaces 220D, the valve unit 240 may be arranged. The frame 301 may have four (4) opener members 250, each of which corresponds to one of the four valve units 240. As the head 200 moves to the capped position P21, the opener members 250 may switch the respective valve units 240 to the connecting state collectively and substantially simultaneously, and as the head 200 leaves the capped position P21, the opener members 250 may switch the respective valve units 240 to the disconnecting state.

According to the second modified example, the first switching assembly may open or close the plurality of first atmosphere communication paths 221K collectively. Therefore, the processes to be conducted by the controller 270 to switch the states of the first atmosphere communication paths 221K may be simplified.

Third Modified Example (First Modified Example of First Switching Assembly)

The first switching assembly may not necessarily have the conveyer 210, the valve unit 240, and the opener member 250 but may consist of, for example, electromagnetic valves, each of which may open or close one of the plurality of first atmosphere communication paths 221K individually. Each electromagnetic valve may have a solenoid and a valve body made of, for example, iron. The controller 270 may apply current to the solenoid in one of the electromagnetic valves, and thereby the valve body may be attracted to the solenoid. Accordingly, the first atmosphere communication path 221K corresponding to the operated electromagnetic valve may be shifted to the connecting state. On the other hand, when the controller 270 does not apply current to the solenoid, the valve body may separate from the solenoid, and the first atmosphere communication path 221K corresponding to the electromagnetic valve may be placed in the disconnecting state.

According to the third modified example, the first atmosphere communication paths 221K, each of which corresponds to one of the electromagnetic valves being the first switching assembly, may individually open or close. Therefore, the processes to be conducted by the controller 270 to switch the states of the first atmosphere communication paths 221K may be simplified, and the states of the first atmosphere communication paths 221K may be switched finely.

Fourth Modified Example (Second Modified Example of Reservoir Section 220 and First Switching Assembly)

For another example, the air chamber 220C in the reservoir section 220 may be formed in an area above the ink reservoir chambers 220B and a rightward area with respect to the ink reservoir chambers 220B, as shown in FIG. 12A. In this arrangement, the valve accommodating space 220D may be formed in a lower area in the air chamber 220C. Meanwhile, the first atmosphere communication path 221K may be formed through the bottom wall 221A in the vertical direction 7.

The first switching assembly may consist of a valve unit 240A and an opener assembly 250A as shown in FIGS. 12A-12C in place of the valve unit 240 and the opener member 250.

As shown in FIGS. 12A-12C, the valve unit 240A may have a spring 241A and a valve body 242A.

The spring 241A may be a compressive coil spring and may be accommodated in the valve accommodating space 220D with an axis thereof aligning in parallel with the vertical direction 7. An upper end of the spring 241A may be fixed to a crosswise divider wall 222C, which delimits the valve accommodating space 220D. To a lower end of the spring 241A, the valve body 242A may be fixed.

The valve body 242A may, when the valve body 242A is not receiving any resisting force from the opener assembly 250A against an urging force of the spring 241A, with an inner surface of the bottom wall 221A serving as a valve seat, close the first atmosphere communication path 221K by the urging force of the spring 241A. Thereby, the first atmosphere communication path 221K may be placed in the disconnecting state, in which the ink reservoir chambers 220B and the outside of the reservoir section 220 are disconnected.

On the other hand, when the valve body 242A receives a resisting force from the opener assembly 250A against the urging force of the spring 241A, the valve body 242A may separate from the bottom wall 221A against the urging force of the spring 241A. Therefore, the valve body 242A may open the first atmosphere communication path 221K, and the first atmosphere communication path 221K may be placed in the connecting state, in which the ink reservoir chambers 220B and the outside of the reservoir section 220 are connected.

The opener assembly 250A may include a switching lever 251A, a driving force transmission device 252A including a gear train, a shaft 253A, a cam 254A, and an opener member 255A.

The switching lever 251A may contact the head 200 when the head 200 moves in the widthwise direction 9. When the head 200 is at the capped position P21, the switching lever 251A may connect a transmission path for the driving force from the conveyer motor 272 to the driving force transmission device 252A. On the other hand, when the head 200 is separated from the capped position P21, the switching lever 251A may disconnect the transmission path for the driving force from the conveyer motor 272 to the driving force transmission device 252A.

The shaft 253A may extend in the widthwise direction 9 at a position lower than the cap 260. Widthwise ends of the shaft 253A may be rotatably supported by a pair of bearings (not shown), which may be arranged on a frame (not shown) to rotate about an axis thereof. The shaft 253A may be rotated by the driving force transmitted through the driving force transmission device 252A.

The cam 254A may convert the rotating force of the shaft 253A into a force in the vertical direction 7 and move the opener member 255A between a contacting position (see FIG. 12C) and a separated position (see FIG. 12B) in the vertical direction 7. The contacting position may be a position, at which the opener member 255A contacts the valve body 242A, and the separated position is a position, at which the opener member 255A is separated from the valve body 242A. While the opener member 255A is in contact with the valve body 242A, the first atmosphere communication path 221K may be in the connecting state. On the other hand, while the opener member 255A is separated from the valve body 242A, the first atmosphere communication path 221K may be in the disconnecting state.

In the embodiment described above, the controller 270 conducts the second-path disconnecting process prior to conducting the flushing process in S103 (see FIG. 10A) and the purging process in S116 (see FIG. 10A). In the second-path disconnecting process, the controller 270 may stop outputting the controlling signals V22 to the conveyer motor 272 and place the opener member 255A at the separated position (see FIG. 12B).

Moreover, the controller 270 may conduct the second-path connecting process prior to conducting the capping process in S115 (see FIG. 10B). In the second-path connecting process, the controller 270 may output the controlling signals V22 to the conveyer motor 272 to move the opener member 255A to the contacting position (see FIG. 12C).

Fifth Modified Example (Modified Example of Image Recording Process in FIGS. 10A-10B)

For another example, the processes in the image recording process shown in FIGS. 10A-10B may be modified as below.

In the embodiment described above, when the printer 100 is standing by, the valve body of the electric-operable three-way valve 282 (see FIG. 8) is located at the first valve position. In contrast, when the printer 100 in the fifth modified example is standing by, the valve body of the electric-operable three-way valve 282 may be located at the second valve position. In this arrangement, the covering space 260A may not be connected with the outside of the cap 260, i.e., the atmosphere, through the fluid communication paths 263, the electric-operable three-way valve 282, or the individual tube 283 that form the second atmosphere communication path.

In the embodiment descried above, moreover, in S103 (see FIG. 10A), the controller 270 conducts the separating process, the second-path disconnecting process, and the flushing process in this recited order. In contrast, in the fifth modified example, the controller 270 may conduct the second-path connecting process prior to the separating process. In particular, in the second-path connecting process, the controller 270 may output the controlling signals V25 to switch the position of the valve body of the electric-operable three-way valve 282 from the second valve position to the first valve position. Thereby, the position of the valve body of the electric-operable three-way valve 282 may be shifted from the second valve position to the first valve position. Accordingly, in the fifth modified example, as well as the embodiment described above, the separating process may be conducted while the covering space 260A is connected with the atmosphere.

In the embodiment described above, moreover, in S115 (see FIG. 10B), the controller 270 conducts the moving process to move the head 200 to the capped position P21, the second-path connecting process, and the capping process in this recited order. Additionally, in the fifth modified example, the controller 270 may conduct the second-path disconnecting process after the capping process. The second-path disconnecting process in S115 may be conducted similarly to the second-path disconnecting process in S103. By conducting the second-path disconnecting process in S115, the second atmosphere communication path may be placed in the disconnecting state when the cap 260 is at the capping position P31.

While the head 200 is capped, the printer 100 may not operate, and the user may move the printer 100 from one location to another location. While the printer 100 is being moved, the printer 100 may sway or roll, and the external force caused by the sway or the roll in the printer 100 may be transmitted to the menisci in the nozzles 203. However, while the head 200 in the fifth modified example is capped, the second atmosphere communication path may be in the disconnecting state, and the covering space 260A may be closed. Therefore, the inks in the nozzles 203 and the air in the covering space 260A may not be exchanged. Accordingly, even when the external force is applied to the menisci in the nozzles 203, the inks in the nozzles 203 may be restrained from leaking to the covering space 260A.

Moreover, according to the fifth modified example, between the second-path disconnecting process in S103 and the second-path connecting process in S115, the second atmosphere communication path may be maintained in the disconnecting state, and the air may not flow in the second atmosphere communication path. Therefore, the second air communication path may be restrained from dehydrating.

While the cap 206 covers the head 200, the lip portion 262 may be resiliently deformed. In the fifth modified example, by conducting the second-path connecting process in S103 prior to the separating process, the pressure that may vary during the separating process due to the change in the volume of the covering space 260A may be released to the atmosphere through the fluid communication paths 263. Therefore, the form of the menisci in the nozzles 203 may be maintained.

Sixth Modified Example (Expandable/Contractive Member 286)

In the embodiment described above, the common tube 281 connects the lower end of the fluid communication path 263 and the inflow port 282A of the electric-operable three-way valve 282 (see FIG. 8). In the sixth modified example, as shown in FIG. 13, the individual tube 284 may connect the lower end of the fluid communication path 263 and the inlet port 290A of the tube pump 290. At an intermediate position between the lengthwise ends of the individual tube 284, a through hole 285 may be formed through the individual tube 284 between an outer circumferential surface and an inner circumferential surface of the individual tube 284. The individual tube 284 may have an expandable/contractive member 286 in a form of a sac. The expandable/contractive member 286 may be attached to the individual tube 284 from the outside to cover the through hole 285. An inner space in the expandable/contractive member 286 and the inner space indie the individual tube 284 may communicate through the through hole 285. The expandable/contractive member 286 may be made of a deformable material, which may be deformable more easily than the individual tube 284, and may expand or contract in response to the pressure variations in the individual tube 284.

When the second atmosphere communication path is placed in the disconnecting state while the head 200 is capped, the volume and the air pressure in the covering space 260A and the second communication path may vary, and the menisci may deform. However, according to the sixth modified example, with the expandable/contractive member 286, expansion or contraction of the volume and the air pressure in the covering space 260A and the second communication path may be absorbed.

Seventh Modified Example (Modified Example of Cap 260 and Lift Assembly 264)

In the embodiment described above, the lift assembly 264 may move between the capping position P31 and the uncapping position P32 by the driving force transmitted from the lift motor 274. Alternately, the lift assembly 264 may be replaced with a lift assembly 259 as shown in FIGS. 14A-14B. The cap 260 and the lift assembly 259 may be moved by use of the carriage 190 moving in the scanning direction 9. While the cap 260 and the lift assembly 259 are in known configurations, in the following paragraphs, description of those will be simplified.

The cap 260 may have a contact member 266, as shown in FIG. 14A-14B, which may contact the carriage 190 moving in the scanning direction 9. The cap 260 may move in the scanning direction 9 as the contact member 266 is pushed by the carriage 190.

The lift assembly 259 may have a first guiding surface 267, a second guiding surface 268, and an inclined surface 269. The first guiding surface 267 may spread in the front-rear direction 8 and the widthwise direction 9 at a position rightward with respect to the platen 180 and support the cap 260 at the uncapping position P32. The second guiding surface 268 may spread in the front-rear direction 8 and the widthwise direction 9 at a position rightward with respect to the first guiding surface 267 and support the cap 260 at the capping position P31. The inclined surface 269 is a plain surface connecting a rightward end of the first guiding surface 267 and a leftward end of the second guiding surface 268.

The cap 260 moving in the scanning direction 9 may move between the first guiding surface 267 and the second guiding surface 268 via the inclined surface 269. Therefore, when the cap 260 is supported by the second guiding surface 268 (see FIG. 14A), the cap 260 may cover the nozzles 203 (not shown in FIGS. 14A-14B) at the capping position P31. On the other hand, when the cap 260 is supported by the first guiding surface 267 (see FIG. 14B), the cap 260 may be located at the uncapping position P32.

Eighth Modified Example (Modified Example of Opener Member 250)

In the embodiment described above, the opener member 250 protrudes from the frame 301 toward the valve body 242 (see FIGS. 4-5). However, alternatively, the opener member 250 may protrude from the valve body 242 outward from the outer wall 221 through the first atmosphere communication path 221K, as shown in FIGS. 15A-15B. In this arrangement, the opener member 250 may contact the frame 301 as the head 200 moves toward the capped position P21, and thereby the valve body 242 may shift the first atmosphere communication path 221K to the connecting state (see FIG. 15A). On the other hand, the opener member 250 may separate from the frame 301 as the head 200 leaves the capped position P21, and thereby the valve body 242 may shift the first atmosphere communication path 221K to the disconnecting state (see FIG. 15B).

MORE EXAMPLES

For another example, the liquid discharging apparatus may not necessarily be limited to the printer 100 as described above but may be a multifunction peripheral machine, a copier, and a facsimile machine. The multifunction peripheral machine may be an apparatus equipped with a plurality of functions among a printing function, a copying function, and a facsimile transmitting/receiving function.

For another example, the printer 100 may have a line-formation printing head in place of the serial-formation printing head 200 when the switching assembly consists of an electromagnetic valve. In the printer 100 with the line-formation printing head 200, the head 200 may not be conveyed in the scanning direction 9 but may stay still at a position above the platen 180.

For another example, the printer 100 may not necessarily be limited to the on-carriage printer but may be a so-called off-carriage printer, in which the reservoir section 220 may not be mounted on the carriage 190 but may be located separately from the carriage 190. When the printer 100 is the off-carriage printer, the reservoir section 220 may not move in the widthwise direction 9 inside the housing 300; therefore, the switching assembly may preferably consist of an electromagnetic valve.

For another example, the sheet M may not necessarily be conveyed in the linear path P2 by the conveyer roller pair 160 or the ejection roller pair 170, or may not necessarily be supported by the platen 180 to be conveyed in the linear path P2, but may be conveyed and supported by a conveyer belt. The conveyer belt may rotate by, for example, the driving force of the conveyer motor 272 to convey the sheet M in the linear path P2.

For another example, the reservoir section 220 may not necessarily be the ink tank fixed to the head 200 but may be a cartridge detachably attached to the head 200.

What is claimed is:

1. A liquid discharging apparatus, comprising:
- a head having a nozzle surface, on which nozzles are formed;
- a reservoir section, having:
  - a liquid reservoir chamber configured to store liquid; and
  - a first atmosphere communication path connecting the liquid reservoir chamber with atmosphere outside the reservoir section,
- the reservoir section being mounted on the head, where the reservoir section and the head are mounted to a carriage for reciprocal movement;
- a liquid flow path connecting the head with the liquid reservoir chamber for the liquid to flow therein;
- a first switching assembly configured to switch states of the first atmosphere communication path between a first connecting state, in which the first atmosphere communication path is connected with the atmosphere, and a first disconnecting state, in which the first atmosphere communication path is disconnected from the atmosphere, the first atmosphere communication path being in the first connecting state where the liquid discharging apparatus is standing by, awaiting input of a liquid-discharging job, without operating the head to discharge the liquid and without supplying the liquid in the liquid reservoir chamber;

a cap having:

a body delimiting a covering space, the body being configured to cover the nozzle surface through the covering space; and a second atmosphere communication path connecting the covering space with the atmosphere; and a movable assembly configured to move the cap between a covering position, at which the body covers the nozzle surface, and a separated position, at which the body is separated from the nozzle surface;

a second switching assembly configured to switch states of the second atmosphere communication path between a second connecting state, in which the second atmosphere communication path is connected with the atmosphere, and a second disconnecting state, in which the second atmosphere communication path is disconnected from the atmosphere;

a pump connected with the covering space through a flow path; and a controller configured to:

control the first switching assembly to switch the state of the first atmosphere communication path from the first connecting state to the first disconnecting state and control the head to discharge the liquid at a sheet with the first atmosphere communication path being in the first disconnecting state;

after discharging the liquid from the head, determine whether a connecting event has occurred, the connecting event being an event different from an event that causes the head to discharge the liquid, and from an event where liquid is supplied to or from the liquid reservoir chamber;

in response to determining that the connecting event has occurred, control the first switching assembly to place the first atmosphere communication path in the first connecting state; and control the movable assembly to move the cap from the separated position to the covering position, wherein the controller is configured to control the second switching assembly to switch the second atmosphere communication path from the second disconnecting state to the second connecting state after an end of discharging of the liquid from the head and before moving the cap from the separated position to the covering position through the movable assembly, wherein the second switching assembly is a three-way valve configured to switch positions of a valve body between a first position, at which the second atmosphere communication path is in the second connecting state and the covering space is disconnected from the pump, and a second position, at which the second atmosphere communication path is in the second disconnecting state and the covering space is connected with the pump, and wherein, with the cap being located at the covering position, the controller is configured to activate the pump to cause the liquid to be expelled from the head through the nozzles, after switching states of the second atmosphere communication path from the second connecting state to the second disconnecting state through the second switching assembly.

2. The liquid discharging apparatus according to claim 1, wherein the controller is configured to control the first switching assembly to operate for placing the first atmosphere communication path in the first connecting state while the cap is located at the covering position.

3. The liquid discharging apparatus according to claim 1, wherein, with the cap being located at the covering position, the second atmosphere communication path is in the second connecting state.

4. The liquid discharging apparatus according to claim 3, wherein the controller is configured to control the second switching assembly to operate for placing the second atmosphere communication path in the second connecting state while the cap is located at the covering position.

5. The liquid discharging apparatus according to claim 1, wherein, with the cap being located at the covering position, the second atmosphere communication path is in the second disconnecting state.

6. The liquid discharging apparatus according to claim 5, wherein the controller is configured to control the second switching assembly to operate for placing the second atmosphere communication path in the second disconnecting state while the cap is located at the covering position.

7. The liquid discharging apparatus according to claim 6, wherein the second atmosphere communication path is in the second disconnecting state while the head is discharging the liquid.

8. The liquid discharging apparatus according to claim 5, wherein the controller is configured to:

control the second switching assembly to operate to switch states of the second atmosphere communication path from the second disconnecting state to the second connecting state before discharging the liquid from the head;

control the movable assembly to move the cap from the covering position to the separated position, after switching states of the second atmosphere communication path from the second disconnecting state to the second connecting state through the second switching assembly; and control the head to discharge the liquid after the movable assembly moves the cap from the covering position to the separated position.

9. The liquid discharging apparatus according to claim 1, wherein the controller is configured to control the first switching assembly to switch states of the first atmosphere communication path from the first connecting state to the first disconnecting state before the liquid is discharged from the head and maintain the first atmosphere communication path in the first disconnecting state while the liquid is being discharged from the head.

10. The liquid discharging apparatus according to claim 6, wherein the controller is configured to control the second switching assembly to operate to switch states of the second atmosphere communication path from the second connecting state to the second disconnecting state after an end of moving the cap from the separated position to the covering position through the movable assembly.

11. The liquid discharging apparatus according to claim 1 wherein the reservoir section comprises a plurality of liquid reservoir chambers, where one of the plurality of liquid reservoir chambers is the liquid reservoir chamber, wherein the reservoir section has a plurality of air chambers, each of which is connected with one of the plurality of liquid reservoir chambers, respectively, wherein the reservoir section has a plurality of first atmosphere communication paths, where one of the plurality of first atmosphere communication paths is the first atmosphere communication path, each of which connects one of the plurality of air chambers with the atmosphere, and wherein the first switching assembly is configured to switch states of the plurality of first atmosphere communication paths collectively between the first connecting state, in which the plurality of first atmosphere communication paths are connected with the outside, and the first disconnecting state, in which the plurality of first atmosphere communication paths are disconnected from the atmosphere.

12. The liquid discharging apparatus according to claim 1, wherein the reservoir section comprises a plurality of liquid reservoir chambers, where one of the plurality of liquid reservoir chambers is the liquid reservoir chamber, wherein the reservoir section has a plurality of air chambers, each of which is connected with one of the plurality of liquid reservoir chambers, respectively, wherein the reservoir section has a plurality of first atmosphere communication paths where one of the plurality of first atmosphere communication paths is the first atmosphere communication path, each of which connects one of the plurality of air chambers with the atmosphere, and wherein the first switching assembly is configured to switch states of the plurality of first atmosphere communication paths individually between the first connecting state, in which each of the plurality of first atmosphere communication paths is connected with the atmosphere, and the first disconnecting state, in which each of the plurality of first atmosphere communication paths is disconnected from the atmosphere.

13. The liquid discharging apparatus according to claim 1, wherein the controller is configured to control the head to discharge the liquid at a sheet, and wherein, one of prior to discharging the liquid at the sheet from the head and while the liquid is being discharged at the sheet from the head, the controller is configured to control the first switching assembly to operate and control the head for arranging the liquid to be discharged from the head located in a position, in which the head does not face the sheet, with the first atmosphere communication path maintained in the first connecting state.

14. The liquid discharging apparatus according to claim 1, wherein the controller is configured to control the head to discharge the liquid at a sheet, and wherein, one of prior to discharging the liquid at the sheet from the head and while the liquid is being discharged at the sheet from the head, the controller is configured to control the first switching assembly to place the first atmosphere communication path in the first disconnecting state and control the head to discharge the liquid in a position, in which the head does not face the sheet, with the first atmosphere communication path maintained in the first disconnecting state.

15. The liquid discharging apparatus according to claim 1, further comprising an expandable/contractive member delimiting an inner space connected with the second atmosphere communication path, the expandable/contractive member being configured to one of expand and contract in response to pressure variations in the second atmosphere communication path.

16. The liquid discharging apparatus according to claim 1, wherein the control of the first switching assembly to place the first atmosphere communication path in the first connecting state comprises moving the carriage with the head and reservoir section from a discharging area to a preset area thereby causing the first switching assembly to switch states of the first atmosphere communication path from the first disconnecting state to the first connecting state.

17. The liquid discharging apparatus according to claim 16, wherein the preset area is a capping area where the cap faces the nozzle surface.

18. The liquid discharging apparatus according to claim 17, further comprising a housing having a projection, wherein when the reservoir section is at the capping area, the projection of the housing contacts the first switching assembly thereby placing the first atmosphere communication path in the first connecting state.

19. The liquid discharging apparatus according to claim 1, wherein the first switching assembly includes:

a conveyer configured to move the carriage reciprocatively in a predetermined movable direction;

a protrusion extending in the predetermined movable direction; and an open/close valve body configured to switchably open and close the first atmosphere communication path, wherein the first atmosphere communication path is formed on a surface of the reservoir section intersecting with the predetermined movable direction, and wherein the controller is configured to control the first switching assembly to switch the states of the first atmosphere communication path from the first disconnecting state to the first connecting state by controlling the conveyer to move the carriage to a predetermined position, at which the protrusion contacts and separates the open/close valve body from the first atmosphere communication path.

* * * * *